(12) United States Patent
Toennessen

(10) Patent No.: US 12,140,721 B2
(45) Date of Patent: Nov. 12, 2024

(54) METHODS AND SYSTEMS OF DEPLOYING AND RETRIEVING STREAMER CLEANING DEVICES

(71) Applicant: PGS Geophysical AS, Oslo (NO)

(72) Inventor: Rune Toennessen, Oslo (NO)

(73) Assignee: PGS Geophysical AS, Oslo (NO)

( * ) Notice: Subject to any disclaimer, the term of this patent is extended or adjusted under 35 U.S.C. 154(b) by 613 days.

(21) Appl. No.: 17/342,097

(22) Filed: Jun. 8, 2021

(65) Prior Publication Data

US 2021/0293991 A1   Sep. 23, 2021

Related U.S. Application Data

(62) Division of application No. 15/895,662, filed on Feb. 13, 2018, now Pat. No. 11,061,166.

(Continued)

(51) Int. Cl.
*G01V 13/00* (2006.01)
*B08B 1/30* (2024.01)
(Continued)

(52) U.S. Cl.
CPC ............. *G01V 13/00* (2013.01); *B08B 1/30* (2024.01); *B08B 3/04* (2013.01); *G01V 1/38* (2013.01)

(58) Field of Classification Search
CPC .......... G01V 13/00; G01V 1/38; B08B 1/008; B08B 3/04
See application file for complete search history.

(56) References Cited

U.S. PATENT DOCUMENTS

| 4,721,055 A | 1/1988 | Pado |
| 6,230,840 B1 | 5/2001 | Ambs |

(Continued)

FOREIGN PATENT DOCUMENTS

| EP | 3239036 A1 | 11/2017 |
| EP | 3264143 A1 | 1/2018 |

(Continued)

OTHER PUBLICATIONS

Tonnessen, R. et al., "Focus on Operational Efficiency and Crew Safety—Introducing Advanced ROV Technology in Marine Towed Streamer Seismic," 2016 EAGE (European Association of Geoscientists & Engineers) Conference and Exhibition, May 2016, 5 pages.

(Continued)

*Primary Examiner* — Krystine E Breier

(57) ABSTRACT

Deploying and retrieving streamer cleaning devices. At least some of the example embodiments are methods including transferring a streamer cleaning device to a geophysical sensor streamer. The transferring may include towing the geophysical sensor streamer through water while the geophysical sensor streamer submerged, towing a tow fish through water by way of an umbilical (the streamer cleaning device coupled within a payload area of the tow fish during the towing of the tow fish through the water), landing the tow fish on the geophysical sensor streamer and thereby abutting the streamer cleaning device against the geophysical sensor streamer, closing the streamer cleaning device around the geophysical sensor streamer, releasing the streamer cleaning device from the payload area, and separating the tow fish from streamer cleaning device and the geophysical sensor streamer.

20 Claims, 15 Drawing Sheets

Related U.S. Application Data

(60) Provisional application No. 62/462,961, filed on Feb. 24, 2017.

(51) Int. Cl.
*B08B 3/04* (2006.01)
*G01V 1/38* (2006.01)

(56) References Cited

U.S. PATENT DOCUMENTS

| | | |
|---|---|---|
| 7,131,389 B1 | 11/2006 | Hawkes |
| 7,409,919 B2 | 8/2008 | Hoogeveen et al. |
| 7,721,669 B1 | 5/2010 | Portmann et al. |
| 7,754,018 B2 | 7/2010 | Lepage et al. |
| 8,265,809 B2 | 9/2012 | Webb |
| 8,514,664 B2 | 8/2013 | Harrick et al. |
| 8,847,722 B2 | 9/2014 | Li et al. |
| 8,875,722 B2 | 11/2014 | Karlsen et al. |
| 8,960,117 B2 | 2/2015 | Nielson et al. |
| 9,126,661 B2 | 9/2015 | McKey, III |
| 9,207,346 B2 | 12/2015 | Turnbull |
| 9,372,280 B2 | 6/2016 | Juhasz et al. |
| 9,488,753 B2 | 11/2016 | Bassett |
| 9,696,449 B2 | 7/2017 | Juhasz et al. |
| 9,709,689 B2 | 7/2017 | Harrick |
| 9,995,846 B2* | 6/2018 | Erneland .............. G01V 1/3808 |
| 10,464,644 B2* | 11/2019 | Le Blanc ................ B63G 8/42 |
| 2004/0051316 A1 | 3/2004 | Spears |
| 2008/0300742 A1* | 12/2008 | Weaver ................ G05D 1/0038 114/312 |
| 2009/0217946 A1* | 9/2009 | Anthony ................ B08B 9/023 134/18 |
| 2010/0212573 A1 | 8/2010 | Hawkes et al. |
| 2011/0174207 A1 | 7/2011 | Harrick et al. |
| 2011/0255369 A1 | 10/2011 | Harrick et al. |
| 2013/0187655 A1 | 7/2013 | Juhasz et al. |
| 2014/0016434 A1 | 1/2014 | Turnbull |
| 2014/0069313 A1* | 3/2014 | Nielsen .................... B63G 8/42 114/244 |
| 2014/0338699 A1 | 11/2014 | Bassett |
| 2015/0226869 A1 | 8/2015 | Harrick |
| 2015/0285949 A1 | 10/2015 | Macquin et al. |
| 2016/0306067 A1 | 10/2016 | Juhasz et al. |
| 2017/0235017 A1 | 8/2017 | Vasbo et al. |
| 2017/0285199 A1 | 10/2017 | Harrick |
| 2017/0297666 A1 | 10/2017 | Le Blanc |
| 2017/0371071 A1* | 12/2017 | Moulinier ............. G01V 13/00 |

FOREIGN PATENT DOCUMENTS

| | | |
|---|---|---|
| GB | 2493452 A | 2/2013 |
| GB | 2505778 A | 3/2014 |
| GB | 2521465 A | 6/2015 |
| JP | H04276908 A | 10/1992 |
| JP | H06166397 A | 6/1994 |
| NO | 334064 B1 | 6/2005 |
| NO | 336205 B1 | 6/2005 |

OTHER PUBLICATIONS

Examination Report mailed Jun. 29, 2018 in European Patent Application No. 17166933.6 filed Apr. 18, 2017, 9 pages.
Extended European Search Report for corresponding European application No. 17166933.6-1751, mailed Oct. 5, 2017, 8 pages.
Extended Search Report in European Patent Application No. 18158347.7; mailed Aug. 6, 2018; 7 pages.
"Ocean Innovations", "Remotely Operated Towed Vehicles (ROTVs)": "https://ocean-innovations.net/companies/bellamare/tow-bodies/remotely-operated-towed-vehicles-rotvs/", retrieved from webpage on Jul. 7, 2019, 1 page.
"Bellamare", ROTVs Brochure: "http://ocean-innovations.net/OceanInnovationsNEW/bellamare/ROTVs.pdf", retrieved from webpage on Jul. 7, 2019, 2 pages.

* cited by examiner

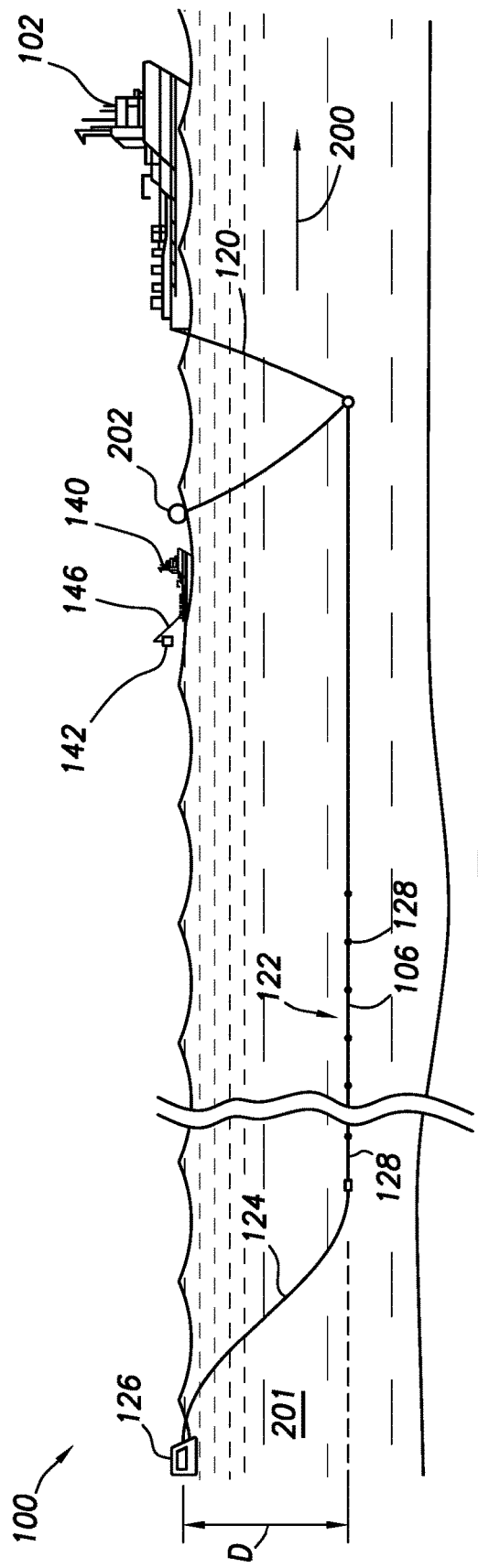
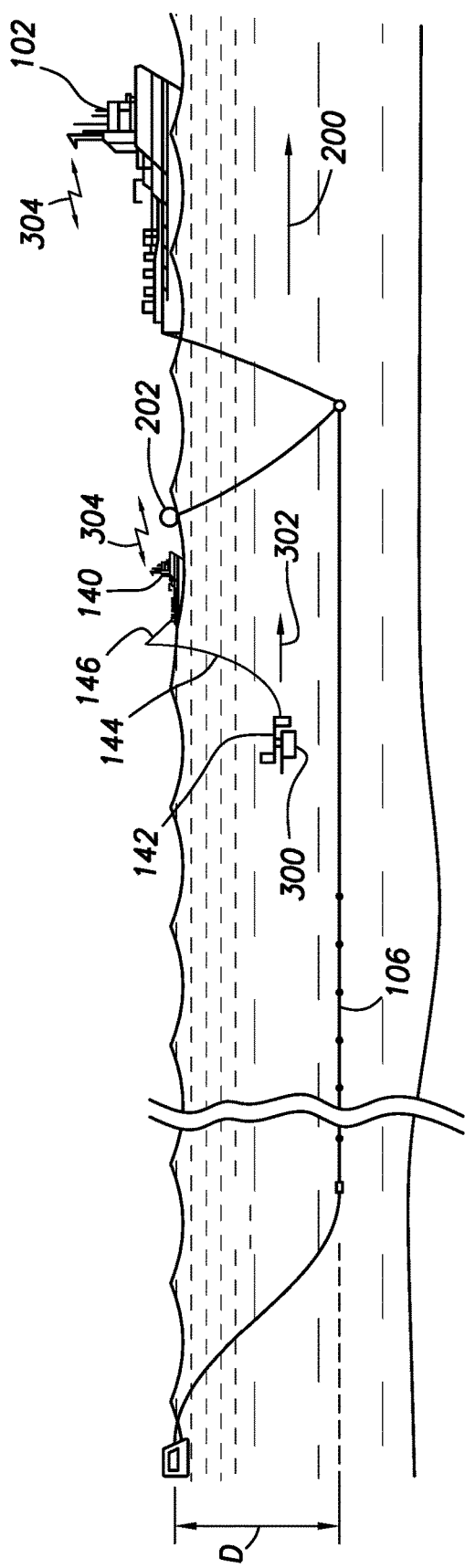
FIG. 2
FIG. 3

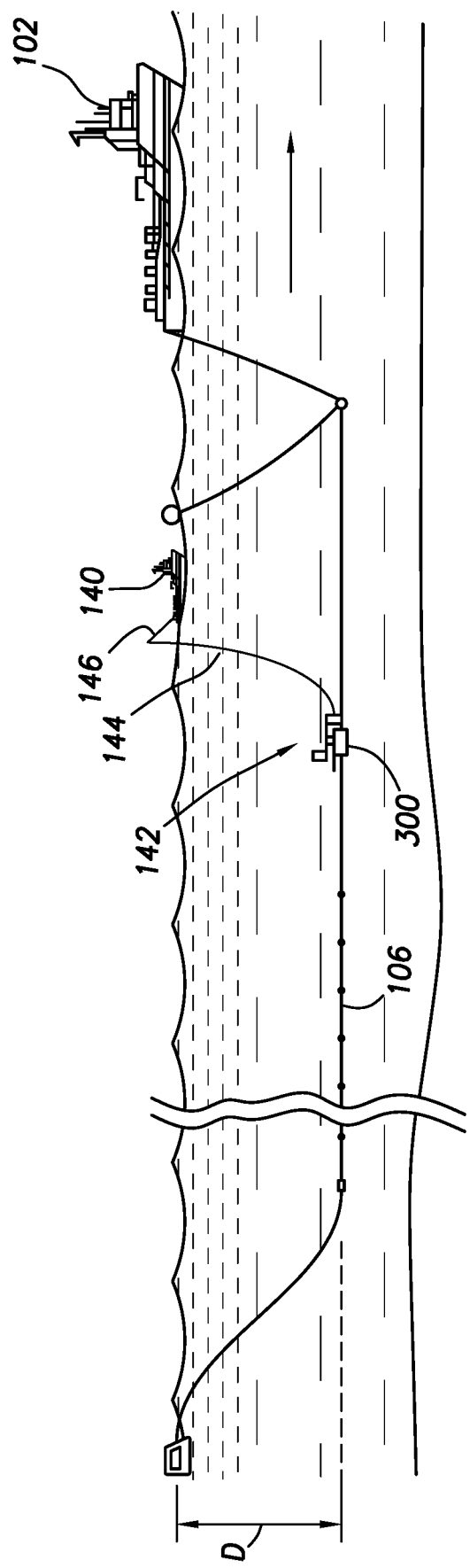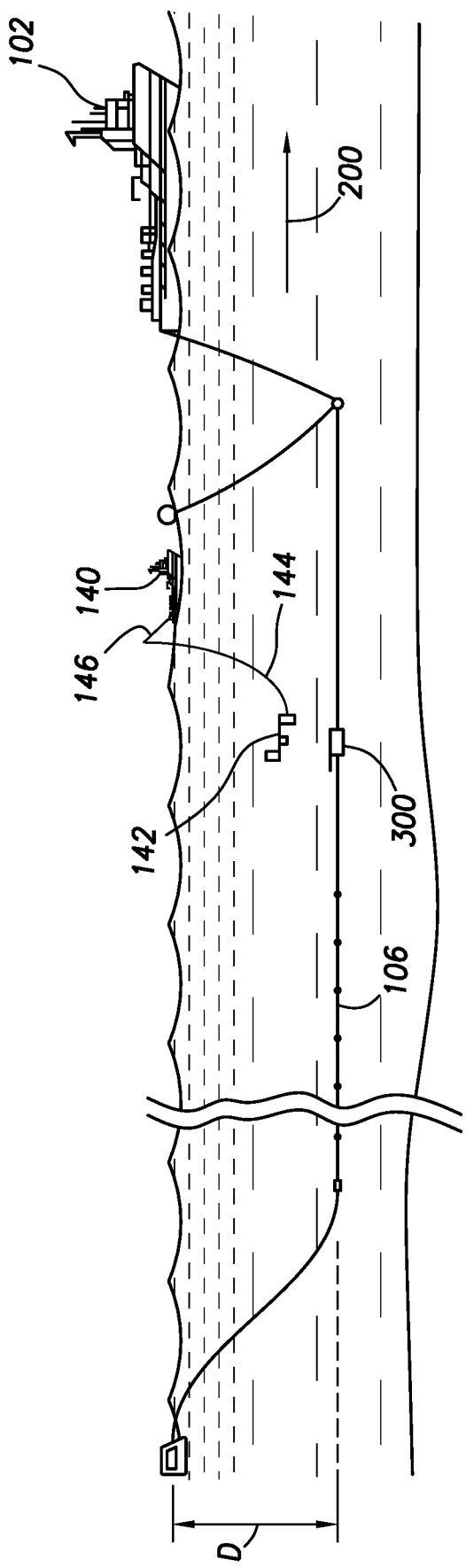

METHODS AND SYSTEMS OF DEPLOYING AND RETRIEVING STREAMER CLEANING DEVICES

CROSS-REFERENCE TO RELATED APPLICATIONS

This application is a divisional of U.S. application Ser. No. 15/895,662 filed Feb. 13, 2018 titled "Methods and Systems of Deploying and Retrieving Streamer Cleaning Devices" (now U.S. Pat. No. 11,061,166). The Ser. No. 15/895,662 application claims the benefit of U.S. Provisional Application Ser. No. 62/462,961 filed Feb. 24, 2017 titled "Streamer Cleaner Unit Deployment". Both applications are incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of geophysical streamers comprising sensors to detect energy emitted by one or more sources after the energy interacts with underground formations below the water bottom. For example, seismic streamers may include sensors for detecting seismic signals reflected from the subterranean formations.

Any object disposed in water in a marine environment is subject or susceptible to marine growth (e.g., barnacles), particularly in tropical waters. To maintain equipment disposed in water, it may be advantageous to periodically clean the equipment. For example, to maintain the sensor streamers, a streamer cleaning device may be used. Any apparatus or method that makes deploying and/or retrieving a streamer cleaning device faster, cheaper, and/or less dangerous may provide a competitive advantage in the marketplace.

BRIEF DESCRIPTION OF THE DRAWINGS

For a detailed description of example embodiments, reference will now be made to the accompanying drawings. It is noted that the various views of the accompanying drawings are not necessarily to scale.

FIG. 2 shows a side-elevation view of a marine geophysical survey system in accordance with at least some embodiments;

FIG. 3 shows a side-elevation view of a marine geophysical survey system in accordance with at least some embodiments;

FIG. 4 shows a side-elevation view of a marine geophysical survey system in accordance with at least some embodiments;

FIG. 5 shows a side-elevation view of a marine geophysical survey system in accordance with at least some embodiments;

NOTATION AND NOMENCLATURE

Figure 1:
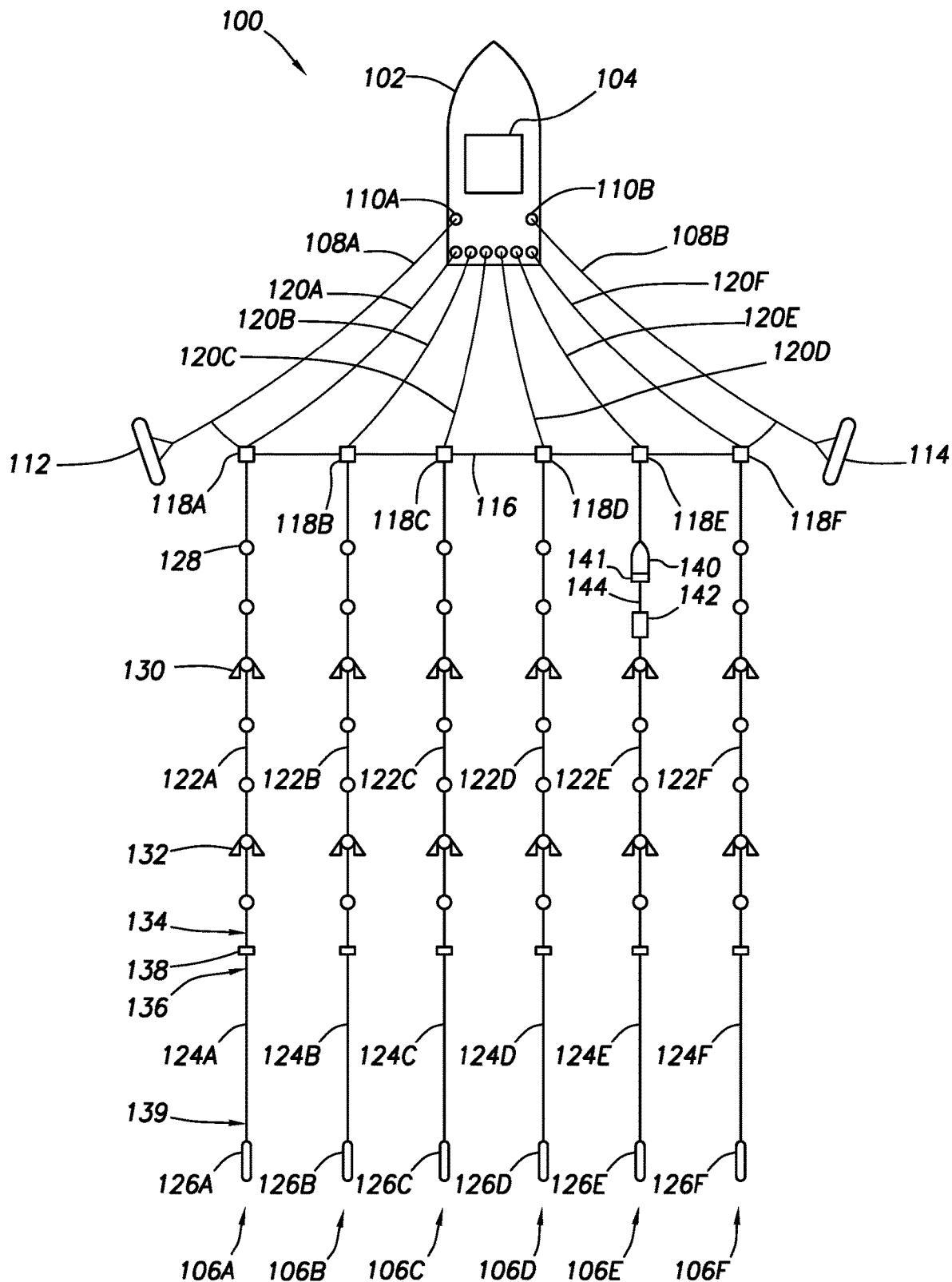
FIG. 1 shows an overhead view of a marine geophysical survey system in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Proximal" and "distal" shall be in reference to tow direction of a geophysical sensor streamer and measured along the geophysical sensor streamer. Thus a proximal end of geophysical sensor streamer is closer to a tow vessel than a distal end of the geophysical sensor streamer. Likewise, a proximal portion of a geophysical sensor streamer is closer to the tow vessel than a distal portion.

"Crab" or "crabbing", with respect to a tow fish, shall mean moving the tow fish axially along a sensor streamer where at least some of the force to move the tow fish is provided by the tow fish itself (e.g., by operation of a traction belt).

"Releasably couple" in relation to two objects shall mean the first object is selectively uncoupled from the second object without cutting, breaking, destroying, or otherwise rendering either the first object or the second object unusable.

When a device or system is said to have a first orientation and a second orientation, the orientations are not simultaneously achievable or simultaneously present.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to deploying a streamer cleaning device onto a geophysical sensor streamer, and later and retrieving the streamer cleaning device from the geophysical sensor streamer. In particular, various embodiments are directed to a tow fish that includes a payload area configured to releasably couple to a streamer cleaning device. The tow fish is towed by a surface vessel, and remotely controlled from a surface vessel (the towing and controlling need not be the same vessel), such that the tow fish is maneuvered to couple the streamer cleaning device to a geophysical sensor streamer. Similarly, after the streamer cleaning device has moved some distance along the length of the geophysical sensor streamer, the tow fish is again towed by the surface vessel (and remotely controlled from a surface vessel) such that the tow fish is maneuvered to retrieve the streamer cleaning device from the geophysical sensor streamer. The description turns first to an example geophysical survey system to orient the reader.

FIG. 1 shows an overhead view of a marine geophysical survey system 100 (hereafter just survey system 100) in accordance with at least some embodiments. In particular, FIG. 1 shows a tow or survey vessel 102 having onboard equipment, herein referred to collectively as recording system 104, such as navigation, energy source control, and data recording and processing equipment. Survey vessel 102 is configured to tow one or more geophysical sensor streamers (hereafter just "sensor streamers" or just "streamers") 106A-F through the water. While FIG. 1 illustratively shows six sensor streamers, any number of sensor streamers may be used.

The sensor streamers 106A-F are coupled to towing equipment that maintains the sensor streamers 106A-F at selected lateral positions with respect to each other and with respect to the survey vessel 102. The towing equipment may comprise two paravane tow lines 108A and 108B each coupled to the vessel 102 by way of winches 110A and 110B, respectively. The second end of paravane tow line 108A is coupled to a paravane 112, and the second end of paravane tow line 108B is coupled to paravane 114. The paravanes 112 and 114 are configured to provide a lateral force component to the various elements of the survey system when the paravanes are towed in the water. The combined lateral forces of the paravanes 112 and 114 separate the paravanes from each other until one or more spreader lines 116, coupled between the paravanes 112 and 114, into tension.

The sensor streamers 106A-F are each coupled, at the ends nearest the survey vessel 102 (i.e., the "proximal" or "forward" ends), to a respective lead-in cable termination 118A-F. The lead-in cable terminations 118A-F are coupled to or associated with the spreader lines 116 so as to control the lateral positions of the sensor streamers 106A-F with respect to each other and with respect to the vessel 102. Electrical and/or optical connections between the appropriate components in the recording system 104 and the sensors in the sensor streamers 106A-F (e.g., sensor 128 in geophysical streamer 106A, discussed more below) may be made using inner lead-in cables 120A-F, respectively.

Each sensor streamer 106A-F can be conceptually divided into an active section and a tail section with a tail buoy. Thus, the sensor streamers 106A-F comprise active sections 122A-F, tail sections 124A-F, and tail buoys 126A-F. There may, in fact, be multiple active sections in each individual sensor streamer. Referring to sensor streamer 106A as representative of all the sensor streamers, active section 122A comprises a plurality of sensors (e.g., sensor 128) spaced along the active section 122A. Each example sensor 128 may be a seismic sensor (e.g., hydrophones, geophones), an electromagnetic sensor, or groups of seismic and electromagnetic sensors.

In order to control depth of the active sections, and in some cases to control lateral spacing between the sensor streamers, the active section of each sensor streamer may be associated with a plurality of streamer positioning devices periodically spaced along the active section. Again referring to sensor streamer 106A as representative, the active section 122A of sensor streamer 106A may be associated with streamer positioning device 130 coupled near the proximal end of the active section 122A. In some cases, the streamer positioning device 130 may provide only depth control, as the lateral spacing of the sensor streamers near the proximal ends may be adequately controlled by the spreader cable 116. Further, representative active section 122A of sensor streamer 106A may be associated with streamer positioning device 132, shown coupled further from the proximal ends near the distal end of the active section 122A. The streamer positioning device 132 may provide only depth control, only lateral control, or both. While FIG. 1 shows only two of streamer positioning devices 130 and 132 associated with active section 122A of sensor streamer 106A, in practice each active section may have many streamer positioning devices periodically spaced along the entire length the active section (e.g., every 200 to 400 meters).

The active sections 122A-F may be referred to as "active" because during a geophysical survey the sensors (e.g., sensor 128 associated with active section 122A) may be used to gather data (e.g., seismic readings, electromagnetic readings), and more particularly during towing of the sensor streamers 106A-F. In practice, each active section 122A-F may be made of a plurality of active segments coupled end-to-end by way of couplers. The active segments that make up the active sections, as well as the couplers within the active sections, are not explicitly shown so as not to unduly complicate the figure. Further in practice, the lengths of the active sections 122A-F may be from a few thousands meters to 10,000 meters or more.

The sensor streamers 106A-F are also associated with tail sections 124A-F, respectively. Again referring to sensor streamer 106A as representative, the active section 122A defines a distal end 134. The proximal end 136 of tail section 124A couples to the distal end 134 of active section 122A, such as by way of couplers 138. Representative tail section 124A also defines a distal end 139, to which tail buoy 126A is coupled. Representative tail section 124A thus couples the distal end 134 of the active section 122A to the tail buoy 126A. The tail section 124A and tail buoy 126A may serve many functions, such as marking the end of the sensor streamer in the water, providing support for the distal end 134 of the active section 122A, and in some cases the tail buoy 126A may have steering capabilities (which steering capabilities may help placement of the active section 122A).

Still referring to FIG. 1, a chase or workboat 140 towing a tow fish 142 via an umbilical 144 suspended from a derrick 146 may be used to deploy a streamer cleaning device (not specifically shown) to a sensor streamer. In the example of FIG. 1, the workboat 140 and tow fish 142 are shown in operational relationship to sensor streamer 106E; however, the workboat 140 and tow fish 142 may transfer the streamer cleaning device to any of the example sensor streamers 106A-F. It is noted that the various objects shown in the overhead view of FIG. 1 are not necessarily to scale; rather, the overhead view of FIG. 1 is designed to orient the reader to overall survey system 100.

FIG. 2 shows a side elevation view of survey system 100. In particular, FIG. 2 shows the survey vessel 102 towing sensor streamer 106 along a path of travel 200 within water body 201, such as sea water. In FIG. 2, for ease of illustration, only a single sensor streamer 106 is shown, but the sensor streamer 106 of FIG. 2 is representative of any of the sensor streamers 106A-F of FIG. 1. Also visible in FIG. 2 is inner lead-in cable 120 coupled to the active section 122, with active section 122 including example sensors 128. Coupled on the distal end of the active section 122 is the tail section 124, and coupled on the distal end of the tail section 124 is tail buoy 126. Example sensor streamer 106 may be towed at a depth D beneath the surface of the water. The towing depth D is selected based on a variety of factors, such as the burial depth of a hydrocarbon reservoir and notch frequency in the gathered data, where the notch frequency is created by signals reflected from the surface of the water incident upon the active section 122 (i.e., surface ghosts). In some cases, the depth D may be about 20 meters, but other depths are possible.

Any object disposed in water in a marine environment is subject or susceptible to marine growth (e.g., barnacles). Marine growth is less pronounced in cold water environments (e.g., the North Sea) and more pronounced in warm water environments, such as tropical waters. The marine growth not only increases the towing force needed to pull the sensor streamers through the water, but also contributes to mechanical noise that adversely affects some seismic surveys. In order to reduce or remove the marine growth, periodically a streamer cleaning device is deployed onto the sensor streamer. The streamer cleaning device moves along the sensor streamer, physically removing marine growth and otherwise cleaning the sensor streamer. In related-art systems, deploying the streamer cleaning device involves raising the sensor streamer to the surface using a work boat and attaching streamer cleaning device. Thereafter, the sensor streamer is again submerged and the geophysical survey can continue as the streamer cleaning device moves along the sensor streamer. Once the streamer cleaning device reaches the distal end of the sensor streamer in the related art, the sensor streamer is again raised to the surface, and the cleaning device is removed. During periods of time when the sensor streamer is at the surface, no geophysical surveying may take place, or at least no data can be gathered from the sensor streamer at the surface.

In accordance with example embodiments of the invention, the streamer cleaning device is deployed onto a sensor streamer, and later retrieved from the sensor streamer, while the sensor streamer is submerged, moving, and possibly recording data as part of a geophysical survey. The specification now turns to an explanation of deploying and retrieving the streamer cleaning device in example systems. Referring again to the drawings, FIG. 2 shows workboat 140 with tow fish 142 suspended from the derrick 146 (i.e., the tow fish 142 has yet to be placed in the water). In example embodiments, deploying the streamer cleaning device takes place at the lead or proximal end of the sensor streamer 106. As the survey vessel 102 continues to tow the sensor streamer 106 along the path of travel 200, the workboat 140 locates (in a macro sense) the proximal end of the sensor streamer 106 based on the location of the lead buoy 202. Once the workboat 140 is in the desired location relative to the lead buoy 202 (and therefore over the proximal end of the geophysical streamer 106), then the next phase of deployment begins.

FIG. 3 shows a side elevation view similar to FIG. 2. In the situation shown in FIG. 3, the workboat 140 has deployed the tow fish 142 (including the streamer cleaning device 300 held within a payload area) into the water by paying out a length of the umbilical 144. Because the survey vessel 102 continues to tow the sensor streamer 106, the workboat 140 likewise continues to move in a direction parallel to the survey vessel 102 to maintain a desired relationship to the lead buoy 202 and thus the proximal end of the sensor streamer 106. Stated otherwise, in example embodiments the forward motion of the tow fish 142 is provided by a force applied to the tow fish 142 from the workboat 140 through the umbilical 144, and thus no propulsion system is needed on the tow fish 142. The tow fish 142 moves in a path of travel 302 that is largely parallel to the path of travel 200 of the survey vessel 102, though as we shall see the tow fish can be maneuvered to control depth as well location in the cross-line directions (i.e., in the view of FIG. 3, the cross-line direction is into and out of the page).

In the example system in FIG. 3, the umbilical 144 is shown coupled to the derrick 146, and thus the tow force provided to the tow fish 142 by way of the derrick 146. However, in other situations the umbilical 144 may couple directly to a spooling device on the workboat 140, and a separate line may be used to deploy the tow fish into the water and to retrieve the tow fish from the water when the tow fish is at the surface of the water. Stated otherwise, while the derrick 146 may be used to deploy the tow fish 142 into the water, and to remove or retrieve the tow fish 142 from the water, the derrick 146 need not necessarily also provide the towing force along the umbilical.

As will be discussed in greater detail below, the tow fish 142 may have a series of control surfaces that enable an operator to maneuver the tow fish 142 within the water. In some situations, the operator maneuvering the tow fish 142 is located on the workboat 140. In other cases, the operator maneuvering the tow fish 142 is located on the survey vessel 102 or some other vessel, and the commands regarding deflection of the control surfaces are sent wirelessly to the workboat 140, as shown by arrows 304, and then relayed to the tow fish 142 by way of the umbilical 144. Similarly, video showing the situation in and near the tow fish 142 (e.g., as the tow fish 142 lands on the sensor streamer 106) may be conveyed from the tow fish 142 to the workboat 140 over the umbilical 144 (and in the situation where the operator resides on the survey vessel 102, the video signals may be wirelessly transferred).

FIG. 4 shows a side elevation view similar to FIG. 3. In the situation shown in FIG. 4, the tow fish 142 has been maneuvered down to and landed on the sensor streamer 106. That is, in example embodiments a sufficient length of umbilical 144 is paid out (e.g., two to six times the depth D of the geophysical streamer 106) to enable the tow fish 142 to maneuver down to and straddle or land on the sensor streamer 106. It is noted, however, that the payout of the umbilical may be a function of depth of the tow fish 142, and thus need not be paid out all at once. Moreover, in some systems the payout of the umbilical may implement heave control such that as the workboat 140 rises and falls on the surface waves, the umbilical 144 is paid out and pulled back to reduce undesirable tugging on the tow fish 142.

In the landed orientation shown in FIG. 4, the streamer cleaning device 300 abuts the sensor streamer 106. Thereafter, based on commands sent along the umbilical 144, the tow fish 142 latches or closes the streamer cleaning device 300 around the sensor streamer 106. Once the streamer cleaning device 300 is closed around the sensor streamer 106, based on commands received across the umbilical 144 the tow fish 142 releases the streamer cleaning device 300 from various contact points within the payload area.

FIG. 5 shows a side elevation view similar to FIG. 4. In the situation shown in FIG. 5, however, the tow fish 142 has separated from streamer cleaning device 300, and the tow fish 142 is in the process of being maneuvered (e.g., by pulling on the umbilical 144 and by operation of the control surfaces) back to the surface of the water to be retrieved by the workboat 140. The streamer cleaning device 300 may thus move along the sensor streamer 106 removing marine growth. Notice that the attaching of the streamer cleaning device 300 in the examples shown took place while the sensor streamer 106 was submerged to its operational depth D, and while the survey vessel 102 towed the sensor streamer 106 through the water along path of travel 200.

At a point later in time than shown in FIG. 5, the streamer cleaning device 300 will have made its way to the distal end of the example sensor streamer 106. The workboat 140 and tow fish 142 of the various embodiments may then be used to retrieve the streamer cleaning device 300 from the sensor streamer 106. In particular, the workboat 140 may position itself over the sensor streamer 106 (such as holding position relative to the tail buoy 126), with the positioning being dynamic as the survey vessel 102 continues to tow the sensor streamer 106 during retrieval in example systems. Thereafter, the tow fish 142 may be deployed from the derrick 146 and a length of umbilical 144 paid out (e.g., two to four times the depth D of the sensor streamer 106).

Figure 6:
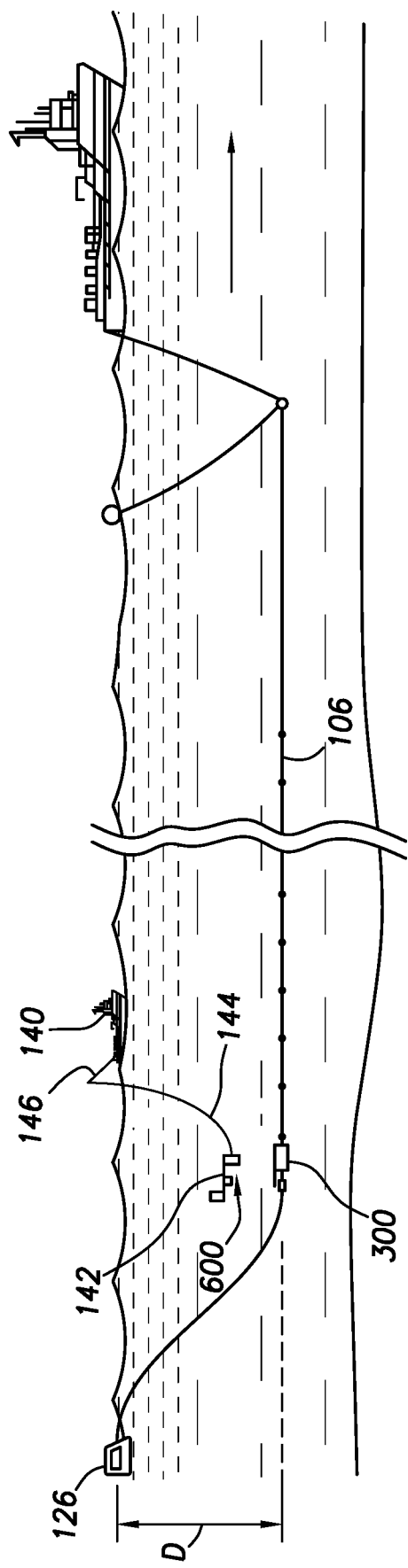
FIG. 6 shows a side-elevation view of a marine geophysical survey system in accordance with at least some embodiments.

FIG. 6 shows a side elevation view after the streamer cleaning device 300 has made its way to the distal end of the sensor streamer 106, after the workboat 140 has deployed the tow fish 142 into the water, and as the tow fish 142 is being maneuvered down to retrieve the streamer cleaning device 300. In particular, during the retrieval the workboat 140 tows the tow fish 142 through the water, while the operator maneuvers the tow fish 142 down to the streamer cleaning device 300 and sensor streamer 106. Visible in FIG. 6 is the payload area 600.

Figure 7:
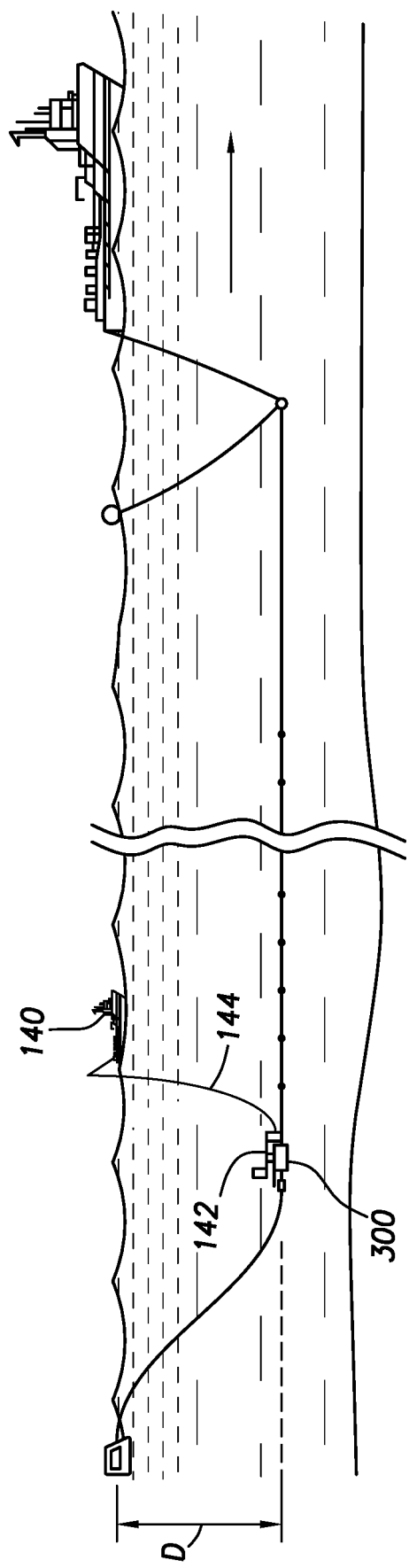
FIG. 7 shows a side-elevation view of a marine geophysical survey system in accordance with at least some embodiments.

FIG. 7 shows a side elevation view after the tow fish 142 is landed over the streamer cleaning device 300 and sensor streamer 106. In some cases, the tow fish 142 is maneuvered such that, once landed, the streamer cleaning device 300 is positioned within the payload area 600 of the tow fish 142 directly. In other cases (and based on structure discussed more below), the tow fish 142 may be landed on the sensor streamer 106 proximally of the location of the streamer cleaning device 300, and the tow fish 142 then crabbed distally along the sensor streamer 106 to position the streamer cleaning device 300 within the payload area 600.

Figure 8:
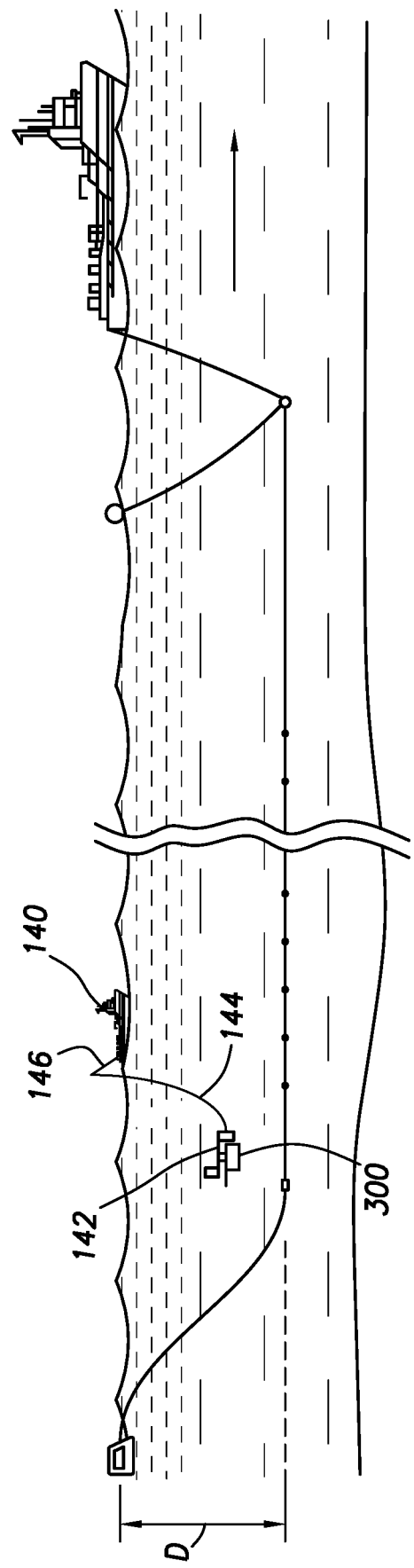
FIG. 8 shows a side-elevation view of a marine geophysical survey system in accordance with at least some embodiments.

Finally, FIG. 8 shows a side elevation view after the tow fish 142 has coupled the streamer cleaning device 300 within the payload area, and separated from the sensor streamer 106 with the streamer cleaning device 300 in tow. The operator thus maneuvers the tow fish 142 and streamer cleaning device 300 back to the surface, whereupon the derrick 146 may raise the tow fish 142 and streamer cleaning device 300 out of the water, possible then to move to the front of the sensor streamer 106, or a different sensor streamer, to re-deploy the streamer cleaning device 300.

Figure 9:
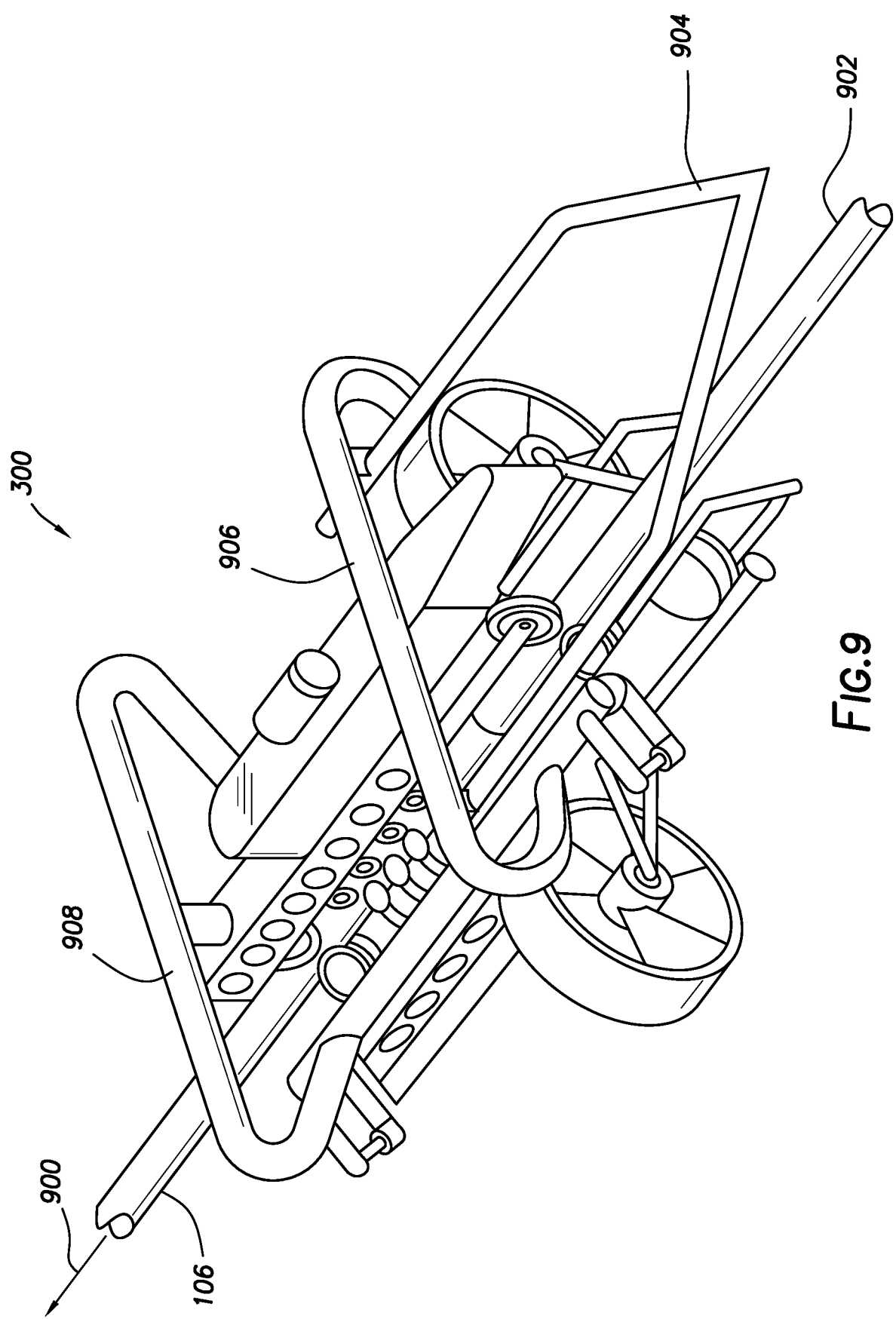
FIG. 9 shows a perspective view of streamer cleaning device in accordance with at least some embodiments.

FIG. 9 shows a perspective view of a streamer cleaning device 300 in accordance with example embodiments. In particular, the streamer cleaning device 300 of FIG. 9 is shown coupled to a sensor streamer 106. The streamer cleaning device 300 is configured to move from a proximal end 900 of the sensor streamer 106 toward a distal end 902, along the way removing marine growth from the sensor streamer 106. Example streamer cleaning devices are self-propelled, operating based on energy derived from turbines that turn based on the movement of the sensor streamer 106 through the water (as towed by the survey vessel 102). Commonly owned U.S. Pat. No. 8,875,722 describes in greater detail a self-propelled cleaner device for sensor streamers, and so as not to unduly complicate the discussion the streamer cleaning device 300, will only be summarized here.

In particular, visible in FIG. 9 is alignment device 904 coupled to upper frame members 906 and 908. The alignment device 904 is configured to interact with the wings of streamer position devices, the wings extending radially outward from a main body coaxial with the sensor streamer 106 (e.g., streamer positioning devices 132). That is, the alignment device 904 rotationally positions the streamer positioning device 132 and/or the streamer cleaning device 300 to enable the wings to move through the streamer cleaning device 300. As will be discussed in greater detail below, the tow fish 142 (not shown in FIG. 9) couples to the streamer cleaning device 300 directly or indirectly by way of the upper frame members 906 and 908 interacting with latching mechanisms in the payload area 600 of the tow fish 142 (neither shown in FIG. 9).

Figure 10:
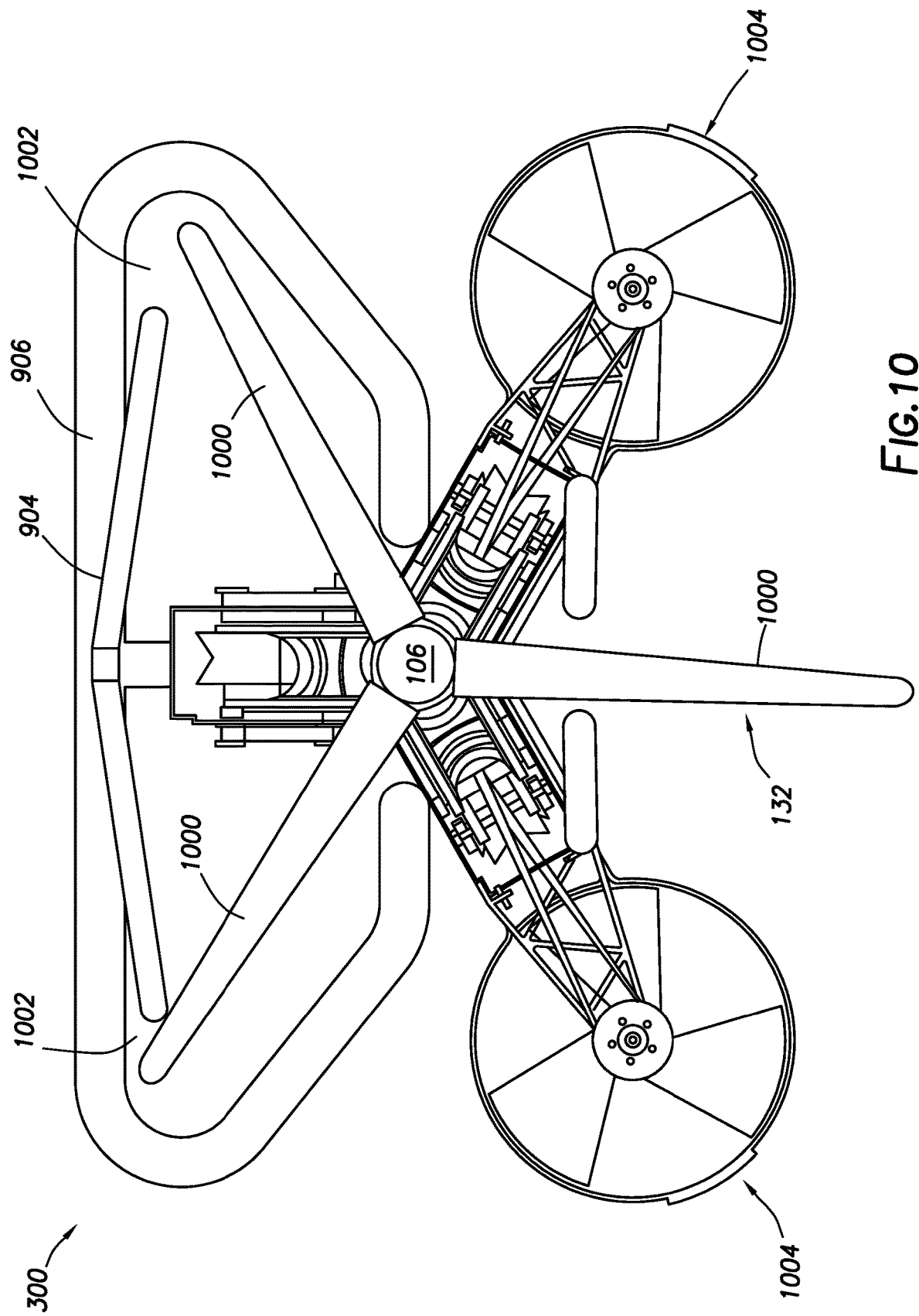
FIG. 10 shows an elevation view of a streamer cleaning device in a closed orientation around a sensor streamer in accordance with at least some embodiments.

FIG. 10 shows a back elevation view of the streamer cleaning device 300 in operational relationship to a sensor streamer 106, with the view of FIG. 10 looking along the sensor streamer 106 from the distal end toward the proximal end. In particular, the view of FIG. 10 shows the streamer cleaning device 300 closed around the sensor streamer 106. The example streamer positioning device 132 of FIG. 10 has three wings 1000 transitioning through the streamer cleaning device 300. That is, the two upper wings 1000 have likely interacted with the alignment device 904 to change the relative rotational orientation of the streamer positioning device 132 and/or the streamer cleaning device 300 such that the upper wings 1000 move through the channels 1002 defined by the upper frame member 906 (and upper frame member 908 (not visible in FIG. 10)). Also visible in FIG. 10 are turbines 1004 that rotate based on movement of the sensor streamer 106 and streamer cleaning device 300 through the water. In the example streamer cleaning device 300, the rotation of the turbines 1004 is transferred by way of belts to operate various components of the streamer cleaning device, such as the cleaning wheels (which physically remove the marine growth) and drive or traction belts (which propel the streamer cleaning device 300 along the sensor streamer 106). Thus, the configuration of the streamer cleaning device 300 shown in FIG. 10 relative to the sensor streamer 106 is the configuration the streamer cleaning device 300 takes when closed around the sensor streamer 106. However, when landing the tow fish 142 along with the streamer cleaning device 300 on the sensor streamer 106 to begin a cleaning operation, and likewise when separating the tow fish 142 and streamer cleaning device 300 from the sensor streamer 106 once the cleaning operation is complete, the streamer cleaning device 300 is opened.

Figure 11:
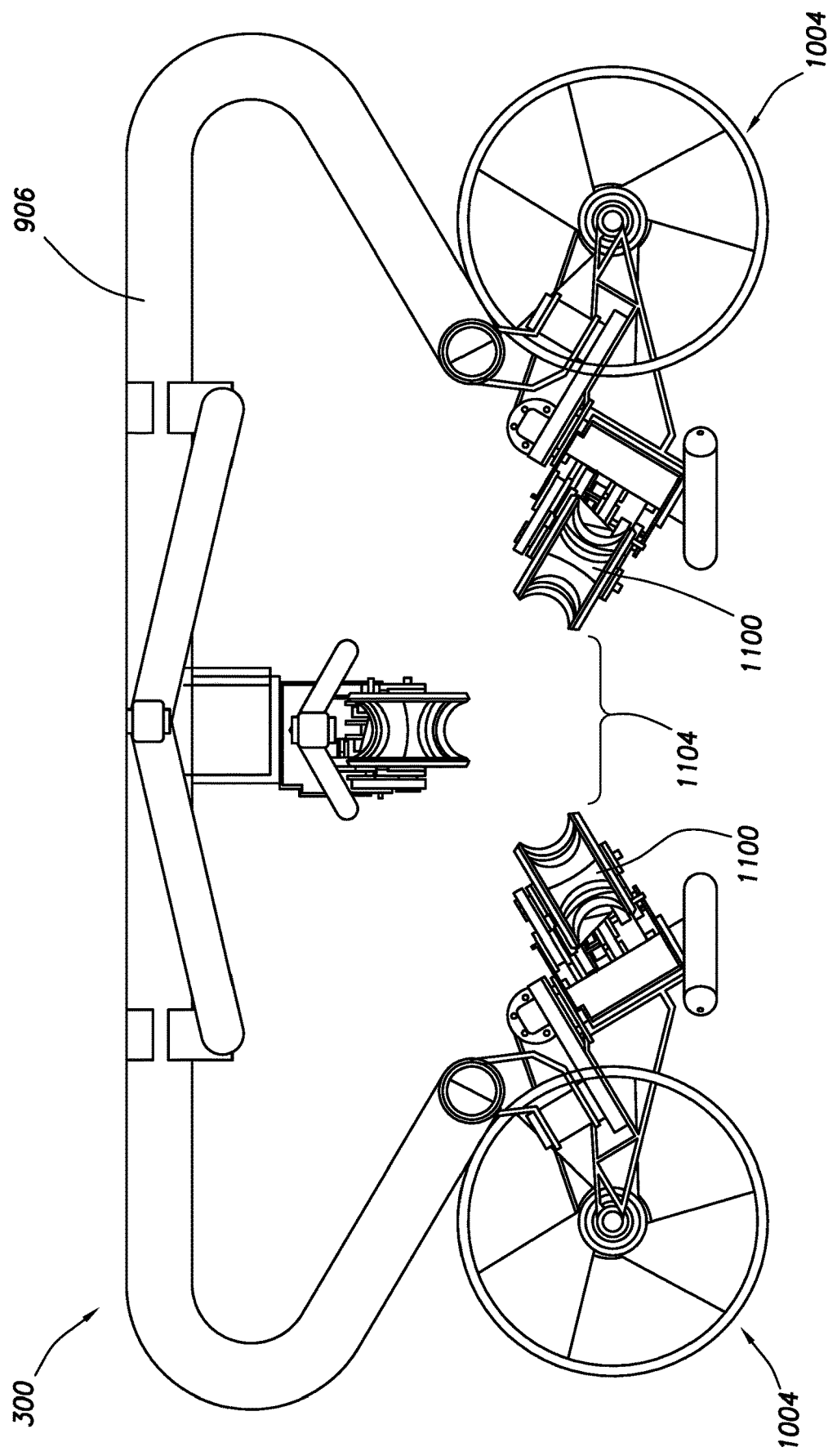
FIG. 11 shows an elevation view of a streamer cleaning device in an open orientation in accordance with at least some embodiments.

FIG. 11 shows an end-elevation view of the streamer cleaning device 300 in an open configuration. In particular, in the example streamer cleaning device 300 of FIG. 11, the lower components, including the turbines 1004 and cleaning wheels 1100, are coupled to the upper frame member 906 (and upper frame member 908 not visible in FIG. 11) such that the various components open or translate away from the location of the sensor streamer to enable the streamer cleaning device 300 to straddle the sensor streamer. That is, the various components on the left side of FIG. 11 (e.g., turbine 1004, cleaning wheel 1100, and other various components) are couple such that the components translate outward (in the view of FIG. 11, to the left) to create open area 1104 for landing over the sensor streamer. Likewise, the various components on the right side of FIG. 11 (e.g., turbine 1004, cleaning wheel 1100, and other various components) are couple such that the components translate outward (in the view of FIG. 11, to the right) to create open area 1104 for landing over the sensor streamer. An example manner of translating the components is discussed in greater detail in commonly owned U.S. Pat. No. 8,875,722 filed Mar. 2, 2011 titled "Self Propelled Cleaning Device for Marine Streamers" (hereby incorporated by reference as if reproduced in full below). It is noted, however, that any suitable method and system may be used to create the open area 1104 for landing over the sensor streamer. Thus, it is the orientation or configuration shown in FIG. 11 in which streamer cleaning device 300 resides both when the tow fish 142 is landing on the sensor streamer to place the streamer cleaning device 300 at the proximal end of the sensor streamer, and when the tow fish 142 is removing the streamer cleaning device 300 from the distal end of the sensor streamer when the cleaning operation is complete. The specification now turns to a configuration of a tow fish 142 in accordance with example systems.

Figure 12:
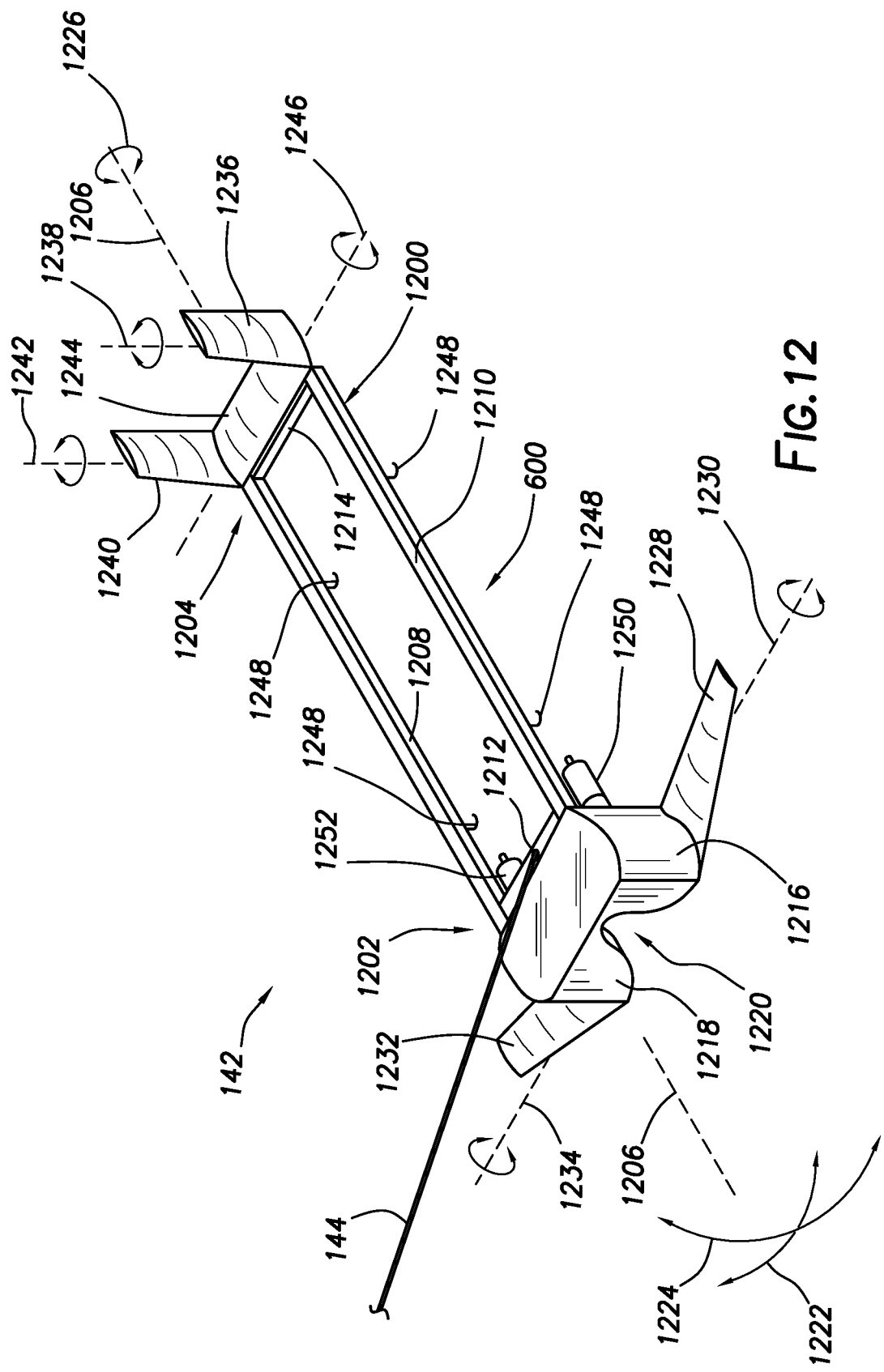
FIG. 12 shows a perspective view of a tow fish in accordance with at least some embodiments.

FIG. 12 shows a perspective view of a tow fish 142 in accordance with example embodiments. In particular, FIG. 12 shows that the tow fish has a frame 1200 that defines a proximal end 1202, a distal end 1204, and a longitudinal or central axis 1206. The example frame 1200 comprises two tubing members 1208 and 1210 that extend parallel to the central axis 1206, and two tubing members 1212 and 1214 that are perpendicular to the tubing members 1208 and 1210 (and likewise perpendicular to the central axis 1206). Thus, the example tubing members 1208, 1210, 1212, and 1214 form a rectangle, and the tubing members themselves are shown as square tubing, but other frame configurations are possible, including additional tubing connections and different tubing cross-sectional shapes. The example tubing members 1208, 1210, 1212, and 1214 define and reside in a plane. In other cases, the frame may be constructed of a streamlined flat body, and thus the tubing members are not strictly required.

The example tow fish 142 further comprises a first stanchion 1216 disposed at the proximal end 1202 of the frame 1200 on a first side of the central axis 1206. The first stanchion 1216 extends downward from the plane of the frame 1200. The example tow fish 142 further comprises a second stanchion 1218 disposed at the proximal end 1202 of the frame 1200 on a second side of the central axis 1206 opposite the first stanchion 1216. The second stanchion 1218 extends downward from the plane of the frame 1200, and the second stanchion 1218 is parallel to the first stanchion 1216. The two stanchions 1216 and 1218 define, at least at the distal tips in example embodiments, cross-sectional shapes in the form of symmetric air foils. In some case, the symmetric air foil shape extends over the entire length of the stanchions. In other cases, and as shown, the inside surfaces (i.e., the surfaces of the stanchions that face each other across the central axis 1206) are shaped to form a notch or channel 1220. In particular, the example tow fish 142 further defines a channel 1220 between the stanchions 1216 and 1218, with the channel 1220 defined below the plane of the frame 1200, the channel 1220 parallel to the central axis 1206, and the channel 1220 residing between the distal ends of the stanchions 1216 and 1218 and the plane of the frame 1200. When landing the tow fish 142 onto a sensor streamer 106 (not shown in FIG. 12), the channel 1220 is used to guide the tow fish 142 in place onto the sensor streamer.

Still referring to FIG. 12, the example tow fish 142 is designed and constructed to be maneuvered through the water by selective deflection of plural control surfaces. That is, as the tow fish 142 is pulled through the water (based on force provided by the umbilical 144), the control surfaces of the tow fish 142 control yaw of the tow fish (the yaw shown by line 1222), pitch of the tow fish (the pitch shown by line 1224), and roll of the tow fish (the roll shown by line 1226). By controlling the yaw, pitch, and roll, the tow fish 142 can be maneuvered not only to control depth, but also to control lateral positioning of the tow fish 142 in relation to a sensor streamer (i.e., control the cross-line position of the of tow fish). The commands regarding selective deflection of the control surfaces may be sent along the umbilical 144, which umbilical 144 may comprise not only communication channels (e.g., electrical conductors, optical conductors) but also ropes to provide the towing force for the tow fish 142, and thus the umbilical is a cable as defined above.

In the example system of FIG. 12, the control surfaces are implemented as a plurality of hydrofoils, rudders, and tail flaps. In particular, a first hydrofoil 1228 extends outward from the first stanchion 1216. The first hydrofoil 1228 has a tapered shape, with the wider portion (measured parallel to the central axis 1206) proximate the stanchion and the narrow portion distally thereof. Moreover, the first hydrofoil 1228 has a swept taper, with the sweep toward the distal end 1204 of the frame. The first hydrofoil 1228 has a rotational axis 1230 about which the hydrofoil 1228 is rotated. A second hydrofoil 1232 extends outward from the second stanchion 1218. Like the first hydrofoil 1228, the second hydrofoil 1232 has a tapered shape, with the wider portion (measured parallel to the central axis 1206) proximate the stanchion and the narrow portion distally thereof. Moreover, the second hydrofoil 1232 has a swept taper, with the sweep toward the distal end 1204 of the frame. The second hydrofoil 1232 has a rotational axis 1234 about which the hydrofoil 1232 is rotated. The example hydrofoils 1228 and 1232 each have a cross-sectional shape (vertical cross-section taken parallel to the central axis 1206) of a symmetric air foil, but other cross-sectional shapes are possible.

The hydrofoils 1228 and 1232 are used to selectively control downward force of the tow fish. For example, the hydrofoils 1228 and 1232 are rotated in the same direction about their respective rotational axis 1230 and 1234. Rotating both leading edges of the hydrofoils 1228 and 1232 up (toward the plane of the frame 1200) causes upward movement. In some cases the hydrofoils 1228 and 1232 are turned or deflected in unison by equal amounts, and in other cases are turned or deflected separately to compensate for roll of the tow fish 142. For example, in the situation where the tow fish 142 is being maneuvered downward to the sensor streamer, if the leading edge of hydrofoil 1228 is rotated downward a first amount, and the leading edge of hydrofoil 1232 is rotated downward a second amount less than the first amount, such will provide a rotational force (e.g., to keep the tow fish 142 level when water currents tend to roll the tow fish 142).

Still referring to FIG. 12, the example control surfaces further comprise a first tail rudder 1236 disposed at the distal end 1204 of the frame 1200, the first tail rudder 1236 extends upward from the plane of the frame 1200, and the first tail rudder 1236 has a rotational axis 1238 about which the first tail rudder 1236 rotates. Though some embodiments use only a single tail rudder, the example tow fish 142 further comprises a second tail rudder 1240 disposed at the distal end of the frame 1200 on the opposite side of the central axis 1206 from the first tail rudder 1236. The second tail rudder extends upward from the plane of the frame 1200, and the second tail rudder 1240 has a rotational axis 1242 about which the second tail rudder 1240 rotates. In the example system, each of the tail rudders 1236 and 1240 has a tapered shape, being wider at the base (measured parallel to the central axis 1206) and narrower at the distal ends thereof. The example tail rudders 1236 and 1240 each have a cross-sectional shape (horizontal cross-section taken parallel to the central axis 1206) of a symmetric air foil, but other cross-sectional shapes are possible.

The tail rudders 1236 and 1240 are used to implement yaw control of the tow fish. To control yaw of the tow fish 142, the tail rudders 1236 and 1240 are rotated in the same direction about their respective rotational axes 1230 and 1234. For example, if both trailing edges of the tail rudders 1236 and 1240 are rotated clockwise (when viewed from above the tow fish 142), the tow fish will tend to yaw in the direction pointed to by the taper of hydrofoil 1228. While in most situations the tail rudders 1236 and 1240 are operated in unison, other situations may implement opposite movement. For example, if additional drag is needed at the distal end of the tow fish, the tail rudders 1236 and 1240 may be operated oppositely (e.g., wherein trailing edge of tail rudder 1236 rotates toward the central axis 1206 and the trailing edge of tail rudder 1240 rotates toward the central axis 1206).

The example tow fish 142 further comprises a tail flap 1244 disposed at the distal end 1204 of the frame 1200. The example tail flap 1244 resides between the tail rudders 1236 and 1240, and the tail flap 1244 defines a rotational axis 1246 about which the tail flap 1244 rotates. The example tail flap 1244 has a cross-sectional shape (vertical cross-section taken parallel to the central axis 1206) of a symmetric air foil, but other cross-sectional shapes are possible. The tail flap 1244 is used to implement, at least in part, pitch control of the tow fish. For example, if the tail flap 1244 is rotated such that the trailing edge moves upward relative the plane of the frame 1200, tow fish 142 will tend to pitch nose upward. In the example tow fish shown, the tail flap 1244 resides between the tail rudders 1236 and 1240 and is coplanar with the plane of the frame 1200 (when the tail flap is in a non-deflected orientation); however, other placements of the tail rudder 1244 are possible, such as at the distal ends of the tail rudders 1236 and 1240 above the plane of the frame 1200. While it is possible to place the tail flap 1244 below the plane of the frame 1200, in the example systems the alignment device 904 of the streamer cleaning device 300 extends beyond the distal end of the tow fish 142, and thus having devices below the plane of the frame 1200 at the distal end may cause interaction and/or interference with deploying and retrieving a streamer cleaning device 300.

The example tow fish 142 further defines a payload area 600. The payload area 600 is defined below the plane of the frame 1200 distal to the stanchions 1216 and 1218. Associated with the payload area 600 is a plurality of latches 1248 (in the example situation, four latches) that selectively couple to the upper frame members of the streamer cleaning device 300. The tow fish 142 further comprises actuators or motors 1250 and 1252. The motors are coupled to the frame 1200 at the proximal end 1202 thereof, and are disposed distally from the stanchions 1216 and 1218. The motors (e.g., electrical, pneumatic) provide a rotational force to close the streamer cleaning device 300 around and/or against the sensor streamer when the streamer cleaning device is being attached to the sensor streamer (e.g., FIG. 10). Likewise, the motors provide a rotational force to open the streamer cleaning device 300 (e.g., FIG. 11) such that the streamer cleaning device 300 can be removed from (and later attached to) the sensor streamer. The motors 1250 and 1252 are disposed on opposite sides of the central axis 1206, yet proximate the frame 1200. In particular, motor 1252 is coupled proximate to tubing member 1208, and motor 1250 is coupled proximate to tubing member 1210. Each motor 1250 and 1252 has a rotor (not specifically numbered in FIG. 12), and the rotational axes of the rotors of the motors 1250 and 1252 are parallel to the central axis 1206. As implied by FIG. 12 (which does not show the streamer cleaning device), motors 1250 and 1252 remain coupled to and part of the tow fish 142 when the tow fish separates from the streamer cleaning device 300.

Figure 13:
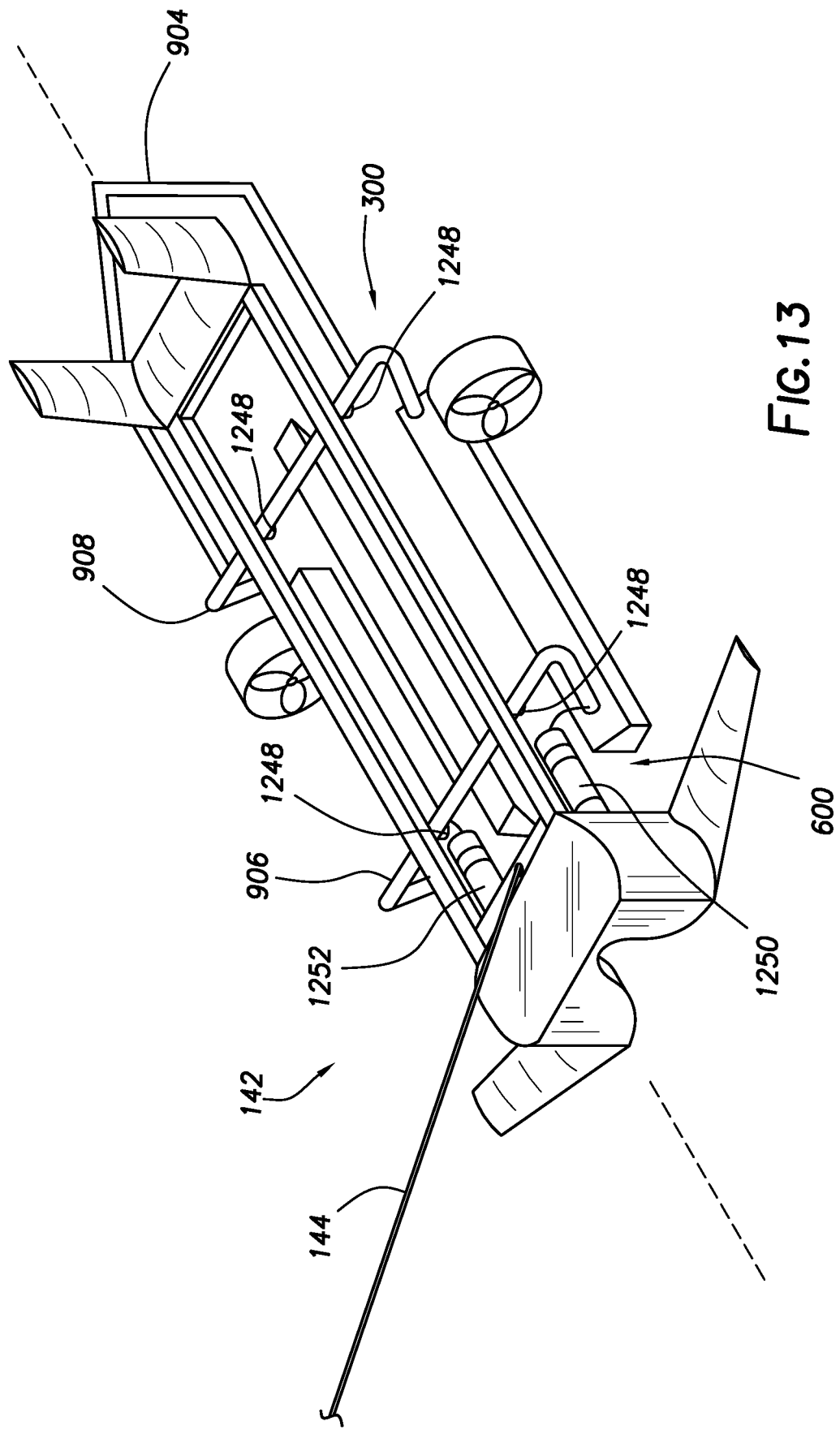
FIG. 13 shows a perspective view of a tow fish coupled to a streamer cleaning device in accordance with at least some embodiments.

FIG. 13 shows a perspective view of tow fish 142 attached to a streamer cleaning device 300 in accordance with example embodiments. In particular, FIG. 13 shows the tow fish 142 having a streamer cleaning device 300 coupled within the payload area 600. The streamer cleaning device 300 of FIG. 13 is shown in simplified form so as not to unduly complicate the figure. With streamer cleaning device 300 held within the payload area 600, latches 1248 couple to the upper frame members 906 and 908 of the streamer cleaning device 300. That is, in the example systems the latches 1248 hold the streamer cleaning device 300 within the payload area 600 by way of the upper frame members 906 and 908. The latches 1248 may take any suitable form depending on the nature of the streamer cleaning device 300, and in example systems the latches may be mechanical latches that physically open and close around the upper frame members 906 and 908, or electromagnetic latches that hold the upper frame members magnetically. In yet still other cases, some or all the latches may be fixed in position, with latching based on relative position of the streamer cleaning device 300 to the frame 1200. For example, the back or distal two latches 1248 may be rigid hooks that couple to the upper frame member 906 by relative movement (e.g., the tow fish and thus the latches move distally to catch the upper frame member 906), while the front two latches selectively operated (e.g., physically opening and closing, or selectively applying electrical energy to an electromagnet). As another example, the front or proximal two latches 1248 may be rigid hooks that couple to the upper frame member 908 by relative movement (e.g., the tow fish and thus latches move distally to catch the upper frame member 908), while the back two latches may be selectively operated (e.g., physically opening and closing, or selectively applying electrical energy to an electromagnet).

Also shown in FIG. 13 is that the motors 1250 and 1252, or at least the rotors of the motors (the rotors not specifically shown), interact with corresponding structure on the streamer cleaning device 300 to selective open and close the streamer cleaning device 300. Moreover, FIG. 13 illustrates that, in some embodiments, portions of the streamer cleaning device 300 extend beyond the distal end of the tow fish 142, and in the example system of FIG. 13 the alignment device 904 extends beyond the distal end of tow fish 142 when the streamer cleaning device 300 is latched within the payload area 600.

Figure 14:
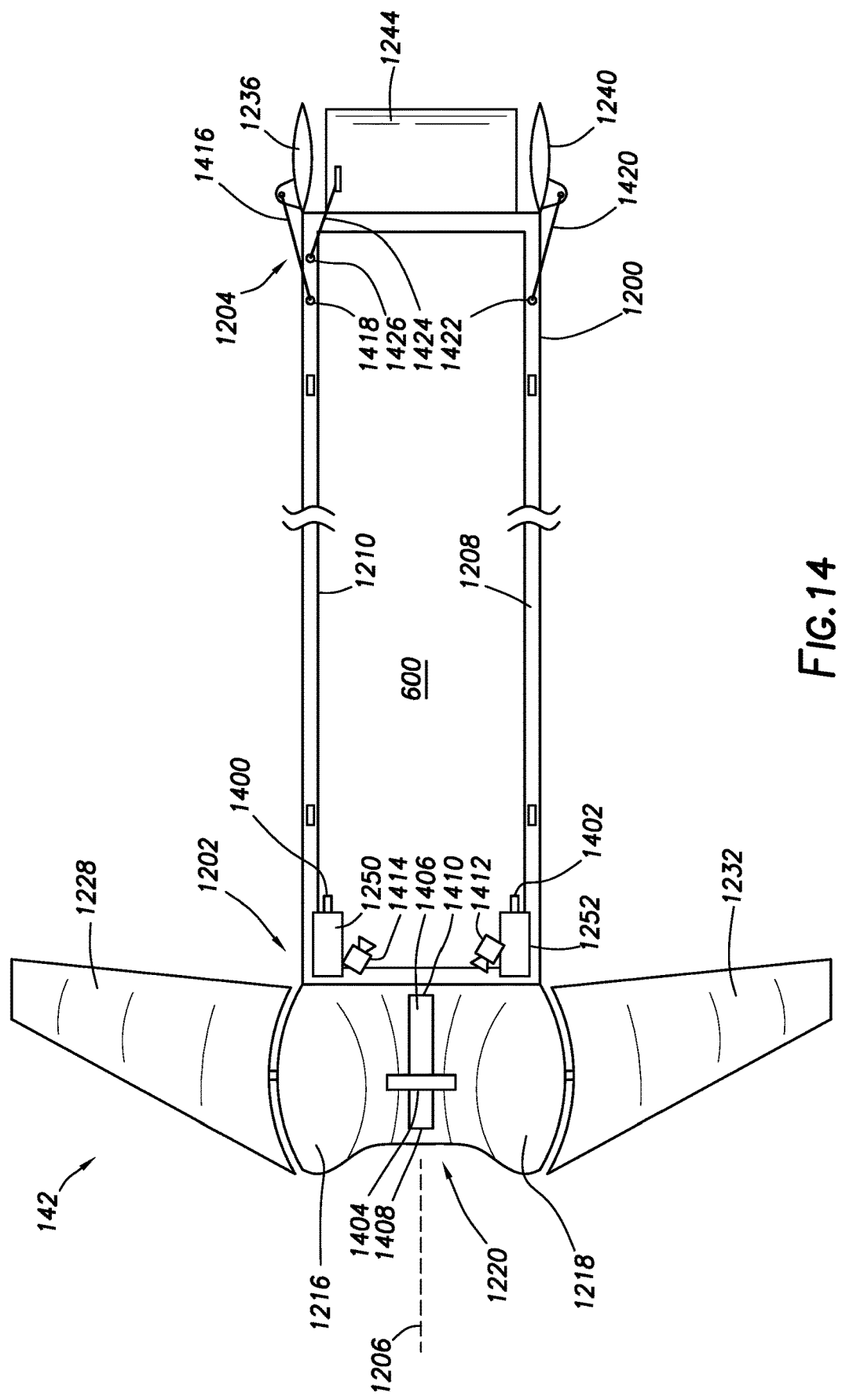
FIG. 14 shows a bottom view of the tow fish in accordance with example embodiments.

FIG. 14 shows a bottom view of the tow fish 142 in accordance with example embodiments. In particular, visible in FIG. 14 is the frame 1200 coupled to the stanchions 1216 and 1218 at the proximal end 1202 of the frame 1200. Extending outward from the stanchions 1216 and 1218 are the hydrofoils 1228 and 1232, respectively. At the distal end 1204 of the frame 1200 are the tail rudders 1236 and 1240, along with the tail flap 1244 disposed between the tail rudders 1236 and 1240. Better shown in FIG. 14 are the motors 1250 and 1252 disposed at the proximal end 1202 of the frame 1200, and again the motors 1250 and 1252 positioned to interact with the streamer cleaning device 300 (not shown in FIG. 14) when coupled within the payload area 600. More particularly, rotors 1400 and 1402 of the motors 1250 and 1252 interact with mechanical components of the streamer cleaning device to open and close the streamer cleaning device 300.

FIG. 14 further shows the channel 1220 defined between the stanchions 1216 and 1218. Channel 1220 runs parallel to the central axis 1206 of the frame member 1200. As discussed above, when landing the tow fish 142 onto a sensor streamer, the channel 1220 is abutted against an outside surface of the sensor streamer as a means to initially align not only the tow fish 142, but also to align the streamer cleaning device 300 (not shown in FIG. 14) with respect to the sensor streamer. In some cases, after placing the channel 1220 over the sensor streamer, the sensor streamer is locked within the channel to avoid inadvertent disassociation of the tow fish 142 from the sensor streamer (and possibly loss of the streamer cleaning device 300). In example systems, the sensor streamer is locked within the channel by way of a locking bar 1404. In particular, locking bar 1404 shown in a deployed orientation or condition in which the locking bar at least partially spans across the channel 1220. Thus, when the channel is abutting the outside surface of the sensor streamer 106, with the locking bar 1404 in the deployed orientation across the bottom outside surface of the sensor streamer, the sensor streamer cannot be removed from the channel 1220, and thus the tow fish 142 is locked to the sensor streamer. In a non-deployed orientation, the locking bar 1404 is retracted (retracted position not shown in FIG. 14) such that the locking bar presents no or little impediment to entry or exit of the sensor streamer relative to the channel 1220. Retracting the locking bar 1404 into the non-deployed orientation may take any suitable form. For example, in some cases the locking bar 1404 physically retracts into one of the stanchions 1216 or 1218. In another example embodiment, the locking bar 1404 comprises two locking components, one of which telescopes within the stanchion 1216, the other of which telescopes within the stanchion 1218. In yet still other embodiments, the locking bar 1404 is hinged to one of the stanchions, and thus deployment involves rotating the locking bar 1404 about the hinge (the axis of rotation parallel to the central axis 1206) to span the channel 1220.

Also visible in FIG. 14 is a portion of a traction belt 1406. Traction belt 1406 is disposed within the channel 1220, and the traction belt defines a contact surface exposed within the channel (i.e., the portion of the traction belt 1406 visible in FIG. 14). In the example system shown, the traction belt 1406 is disposed at the upper deflection point of the channel 1220 such that the mass of the tow fish 142 (and downward force presented by the hydrofoils 1228 and 1232) tends to press the track belt against the sensor streamer. Other locations and numbers of traction belts are possible (e.g., one traction belt in each stanchion and exposed on the walls of the channel 1220 between the distal ends of the stanchions and the apex of channel such that, when a sensor streamer is in the channel the traction belts abut or are pressed against the "sides" of the sensor streamer). The traction belt 1406 may be a continuous belt that turns around pulleys at the proximal end 1408 and distal end 1410 (the pulleys are within an interior volume of the structure of the stanchions/channels and thus not visible in FIG. 14). The traction belt 1406 operates similarly to a conveyor belt, except rather than conveying objects resting on the belt, the traction belt 1406 abuts the outside surface of a sensor streamer within the channel 1220, and can move or crab the tow fish 142 (and streamer cleaning device if present) along the sensor streamer. That is, the traction belt 1406 may move the tow fish toward the proximal end of the sensor streamer, or may move the tow fish toward the distal end of the sensor streamer. For example, during operations where the tow fish 142 is retrieving a streamer cleaning device from the distal end of a sensor streamer after a cleaning operation on the sensor streamer has completed, the tow fish 142 may be maneuvered down to the sensor streamer proximally of the streamer cleaning device. With the sensor streamer disposed within the channel 1220 (and possibly locked in the channel by locking bar 1404), the tow fish 142 may crab distally by operation of the traction belt 1406 to position the tow fish 142 such that the streamer cleaning device properly resides within the payload area. A similar operation in reverse may be used by the tow fish during deployment of the streamer cleaning device onto the sensor streamer at the proximal end of the sensor streamer. That is, the tow fish 147 may position the streamer cleaning device and close the streamer cleaning device around the sensor streamer (e.g., by operation of motors 1250 and 1252). The tow fish 142 may then crab proximally based on operation of the traction belt 1404 to unlatch the streamer cleaning device and/or to clear the streamer cleaning device fully or partially from the payload area before retracting the locking bar 1404 and maneuvering away from the sensor streamer and streamer cleaning device.

Still referring to FIG. 14, the tow fish 142 further comprises a camera 1412 coupled the frame 1200. The camera 1412 has a proximal- or forward-looking field of view that includes the channel 1220. Thus, during operations where the tow fish 142 is being maneuvered onto the sensor streamer, the operator (e.g., on the work vessel 140 or survey vessel 102) may view channel 1220 and the area in front of and beneath the channel 1220 to help properly guide the tow fish 142 onto the sensor streamer 142. The example tow fish further comprises another camera 1414 coupled to frame 1200. The camera 1414 has a distal- or rearward-looking field of view that includes the payload area 600. Thus, during operations where the tow fish 142 is deploying or retrieving the streamer cleaning device, the operator (e.g., on the work vessel 140 or survey vessel 102) may view payload area 600 to help properly guide the tow fish 142 onto or away from the streamer cleaning device 300.

Also visible in the view of FIG. 14 are the various cables used to deflect the tail rudders 1236 and 1240 and tail fin 1244. In particular, deflection rod 1416 emerges from an aperture 1418 in the tubing member 1210. The proximal end of the deflection rod 1416 is coupled to an actuator (e.g., a linear actuator) disposed in the internal volume defined by the stanchions 1216 and 1218. The deflection rod 1416 couples to the tail rudder 1236 so as to selectively deflect tail rudder 1236. Thus, deflection rod 1416 may carry axial loads in the form of tension and compression. Similarly, deflection rod 1420 emerges from an aperture 1422 in the tubing member 1208. The proximal end of the deflection rod 1420 is coupled to an actuator (e.g., a linear actuator) disposed in the internal volume defined by the stanchions 1216 and 1218. The deflection rod 1420 couples to the tail rudder 1240 so as to selectively deflect tail rudder 1240. Thus, deflection rod 1420 may carry axial loads in the form of tension and compression. Finally, deflection rod 1424 emerges from an aperture 1426 in the tubing member 1210, though the deflection rod may emerge from any suitable location. The proximal end of the deflection rod 1424 is coupled to an actuator (e.g., a linear actuator) disposed in the internal volume defined by the stanchions 1216 and 1218. The deflection rod 1424 couples to the tail flap 1244 so as to selectively deflect tail flap 1244.

Figure 15:
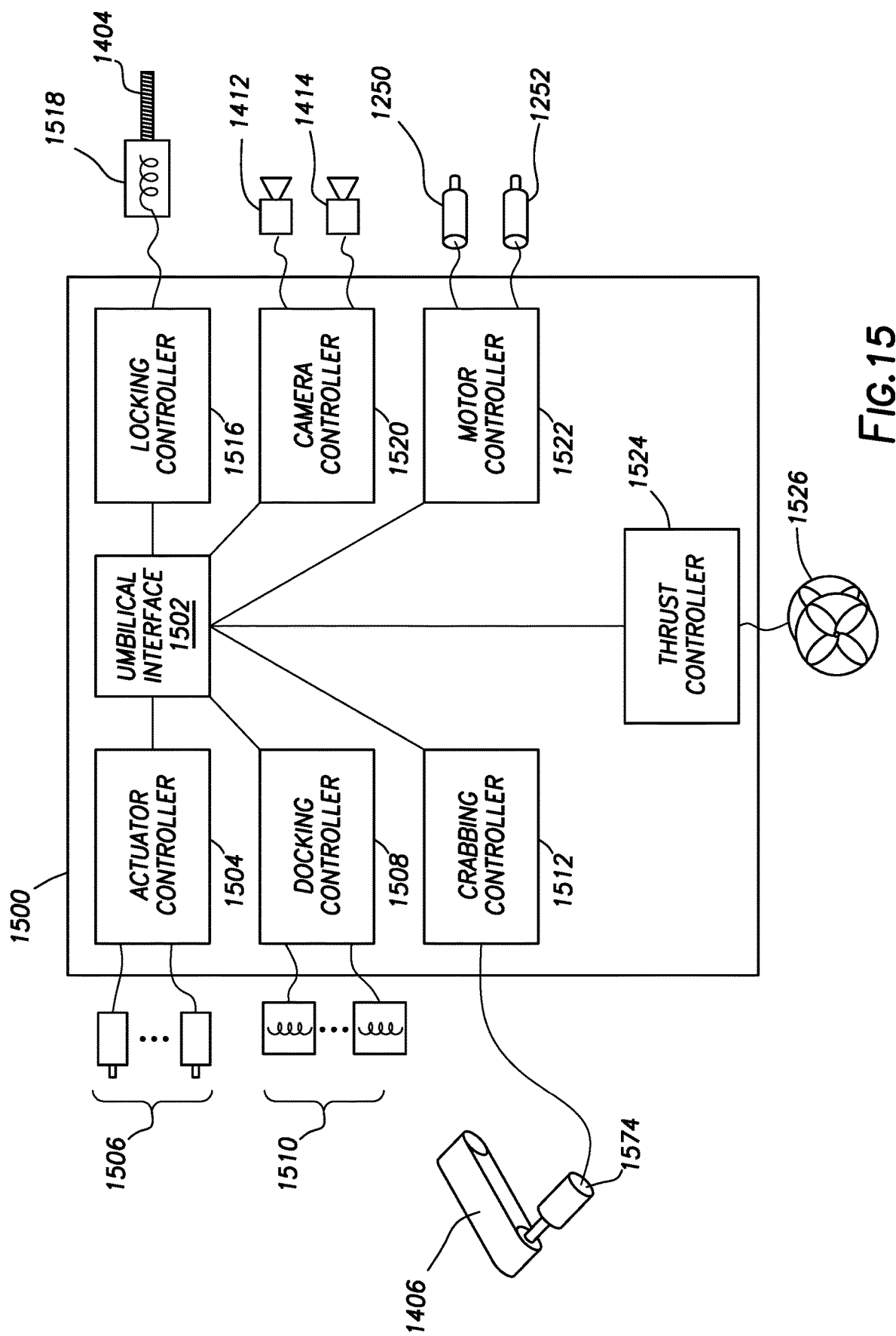
FIG. 15 shows an electrical block diagram of a control system in accordance with example embodiments.

FIG. 15 shows an electrical block diagram of a control system 1500 in accordance with example embodiments. In particular, the control system 1500 may be disposed in a water-tight compartment within an interior volume defined by the stanchions 1216 and 1218, or any other suitable location (e.g., in a water-tight compartment above the payload area 600). The control system 1500 comprises several subsystems. Each subsystem will be addressed in turn, starting with the umbilical interface 1502. The umbilical interface 1502 communicatively couples the various other subsystems to communication pathways within the umbilical 144 (not shown in FIG. 15). For example, the umbilical interface 1502 may receive and route package-based messages from the umbilical to any of the various other subsystems, and may also receive packet-based messages from the subsystems and route the messages to the surface over the umbilical 144. The umbilical interface 1502 may also receive power across the umbilical from the surface vessel (e.g., workboat 140), and route the power to the various subsystems.

The control system 1500 further comprises an actuator controller 1504 communicatively coupled to the umbilical controller 1502. The actuator controller 1504 operatively couples to devices that control the deflection of the control surfaces. In the example shown in FIG. 15, the actuator controller 1504 is shown coupled to motors 1506 to illustrate control of deflection of the control surfaces; however, the actuator controller 1504 may couple to and control any suitable device or devices that can control deflection of the control surfaces (e.g., linear motors coupled to the deflection rods of the tail rudders and tail flap, stepper motors). The precise electrical makeup of the actuator controller 1504 will depend on the type of actuators controlled, but the actuator controller 1504 may have a processor and memory coupled to the processor, the memory storing programs executed by the processor to control deflection of the various control surfaces based on commands received from the operator at the surface across the umbilical.

The control system 1500 further comprises a docking controller 1508 communicatively coupled to the umbilical controller 1502. The docking controller 1508 operatively couples to devices that control the latches within the payload area. In the example shown in FIG. 15, docking controller 1508 is shown coupled to solenoids 1510 to illustrate control of the latches; however, the docking controller 1508 may couple to and control any suitable device or devices that can selectively latch the streamer cleaning device within the payload area (e.g., linear motors, stepper motors, and electromagnets). The precise electrical makeup of the docking controller 1508 depends on the type of latching actuators controlled, but the docking controller 1508 may have a processor and memory coupled to the processor, the memory storing programs executed by the processor to control latching based on commands received from the operator at the surface across the umbilical. Alternatively, the functionality of the control may be implemented by other means—for example, by way of an application-specific integrated circuit (ASIC) or field-programmable gate array (FPGA) system.

The control system 1500 further comprises a crabbing controller 1512 communicatively coupled to the umbilical controller 1502. The crabbing controller 1512 operatively couples to the devices that control movement of the traction belt 1406 (and thus control crabbing of the tow fish 142). In the example shown in FIG. 15, the crabbing controller 1512 is shown coupled to a motor 1514 to illustrate control of the traction belt 1406; however, the crabbing controller 1512 may couple to and control any suitable device or devices that can control movement of the traction belt 1406 (e.g., stepper motors, pneumatic motors, hydraulic motors). The precise electrical makeup of the crabbing controller 1512 depends on the type of motors controlled, but the crabbing controller 1512 may have a processor and memory coupled to the processor, the memory storing programs executed by the processor to control movement of the traction belt 1406 based on commands received from the operator at the surface across the umbilical.

The control system 1500 further comprises locking controller 1516 communicatively coupled to the umbilical controller 1502. The locking controller 1516 operatively couples to devices that control movement of the locking bar 1404. In the example shown in FIG. 15, the locking controller 1516 is shown coupled to solenoid 1520 that selective extends and retracts the locking bar 1404; however, the locking controller 1516 may couple to and control any suitable device or devices that can extension and retraction of the locking bar 1404 (e.g., linear motors, stepper motors). The precise electrical makeup of the locking controller 1516 depends on the type of actuator controlled, but the locking controller 1516 may have a processor and memory coupled to the processor, the memory storing programs executed by the processor to control extension and retraction of the locking bar 1404 based on commands received from the operator at the surface across the umbilical.

Still referring to FIG. 15, the control system 1500 further comprises camera controller 1520 communicatively coupled to the umbilical controller 1502. The camera controller 1520 operatively couples to cameras 1412 and 1414, which cameras 1412 and 1414 provide visualization of the situation near the tow fish 142 during deployment and retrieval operations. The precise electrical makeup of the camera controller 1520 depends on the type of cameras and the communication scheme used to compress and send the video images to the surface through the umbilical interface 1502 and up the umbilical 144. The camera controller 1520 may have a processor and memory coupled to the processor, the memory storing programs executed by the processor to control use of the cameras 1412 and 1414.

The control system 1500 further comprises a motor controller 1522 communicatively coupled to the umbilical controller 1502. The motor controller 1522 operatively to the motors 1250 and 1252 that close and open and the streamer cleaning device 300 around the sensor streamer. The precise electrical makeup of the motor controller 1522 depends on the type of motors controlled (e.g., AC motors, DC motors, stepper motors, hydraulic, pneumatic), but the motor controller 1522 may have a processor and memory coupled to the processor, the memory storing programs executed by the processor to control the timing and speed of operation of motors 1250 and 1252 based on commands received from the operator at the surface across the umbilical.

Finally with respect to FIG. 15, the control system 1500 further comprises a thrust controller 1524 communicatively coupled to the umbilical controller 1502. The thrust controller 1524 operatively couples a thrust device 1526 that selectively provides thrust for operation of the tow fish 142. It is noted, however, that if the thrust device 1526 is implemented, the thrust provided is to aid in steering the tow device 142 onto or away from the sensor streamer. The force used to propel the tow fish 142 through the water is largely provided (e.g., 80% or more) by force provided across the umbilical 144. For example, the thrust device 1526 may be used to provide an extra thrust for lateral or cross-line placement of the tow fish 142 during deployment operations. The thrust device 1526 may be used to provide an extra thrust for separating the tow fish 142 from the sensor streamer during retrieval operations. Though not specifically shown on the previous drawings so as not unduly complicate those drawings, the thrust device 1526 may be placed at any suitable location (e.g., associated with the stanchions 1216 and 1218, above or below the plane of the frame. The precise electrical makeup of the thrust controller 1524 depends on the driving mechanism of the thrust devices used (e.g., AC motors, DC motors, stepper motors, hydraulic, pneumatic), but the thrust controller 1527 may have a processor and memory coupled to the processor, the memory storing programs executed by the processor to control the timing and speed of operation of thrust devise(s) 1526 based on commands received from the operator at the surface across the umbilical.

The example control system 1500 of FIG. 15 shows individual controllers for each sub-system; however, now understanding the tow fish 142 and the control system 1500, with the benefit of this disclosure one of ordinary skill would recognize that the controllers may be combined in any suitable fashion (e.g., actuator controller 1504 combined with the motor controller 1522 and the thrust controller). Moreover, the functionality of any of the controllers, alone or in combination, may be implemented by other means—for example, by way of an application-specific integrated circuit (ASIC) or field-programmable gate array (FPGA) system.

Figure 16:
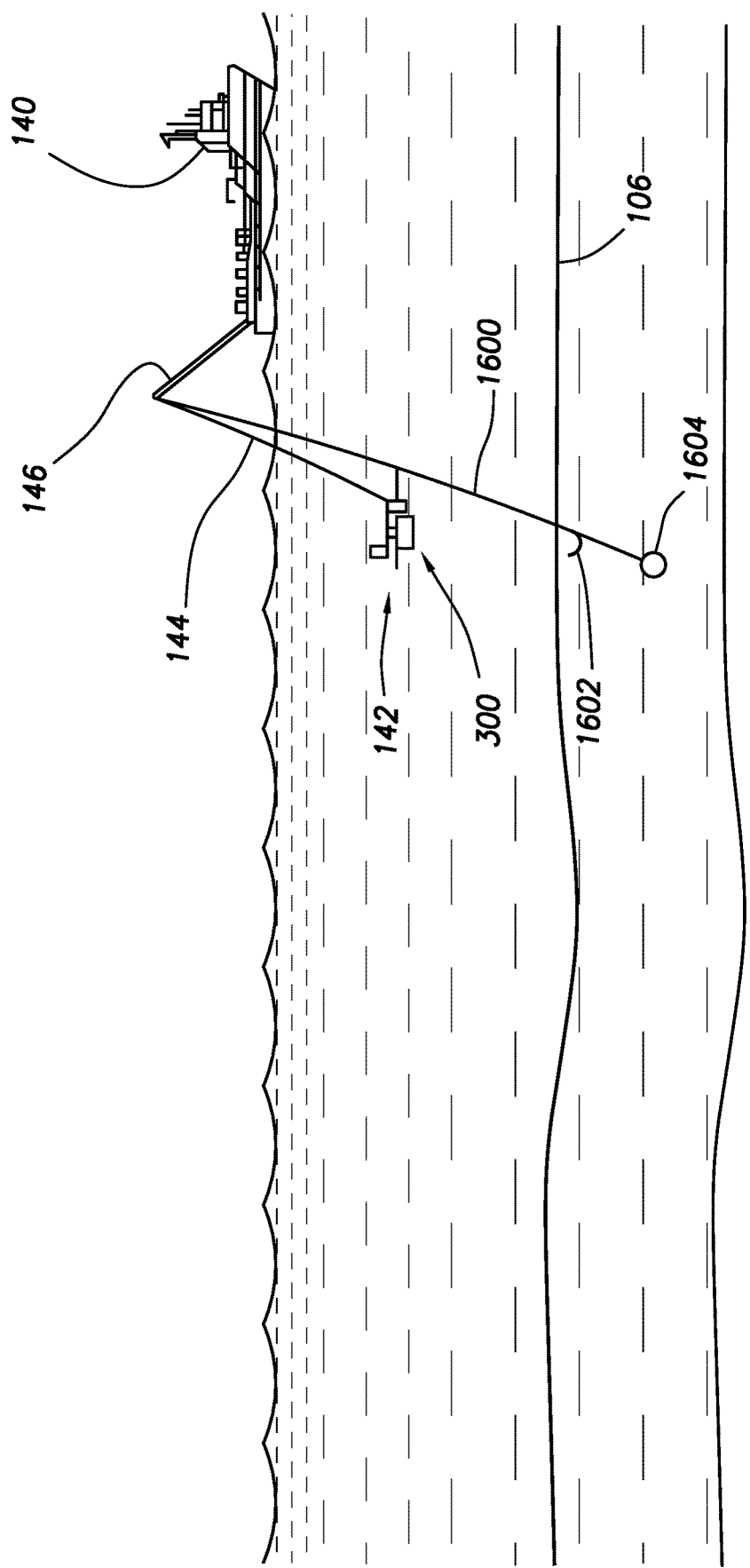
FIG. 16 shows a side-elevation view of a deployment and retrieval method in accordance with at least some embodiments.

FIG. 16 shows a side-elevation view of a deployment and retrieval method in accordance with at least some embodiments. In particular, visible in FIG. 16 is the workboat 140 above a sensor streamer 106. Also shown is the umbilical 144 coupled to the tow fish 142, and the umbilical 144 held by the derrick 146. Unlike the previous embodiments where the tow fish 142 is maneuvered down to the sensor streamer by way of control surfaces, and likewise maneuvered back to the surface by the control surfaces, in the example embodiments shown in FIG. 16 the tow fish 142 is guided to the sensor streamer 106 by way of guide line 1600. That is, regardless of the whether involved in an initial deployment of the streamer cleaning device 300, or retrieval of the streamer cleaning device 300 after cleaning of the sensor streamer 106 is complete, the first step is deployment of a guide line 1600 comprising a hook 1602. In the example system of FIG. 16 the guide line also comprises a weight 1604 (or other depressor device) that helps pull the distal end of the guide line 1600 deeper than the sensor streamer. In some cases, the weight 1605 and hook 1602 may be the same device. The hook 1602 of the guide line 1600 may then be drawn upward to hook the sensor streamer 106. Stated otherwise, the guide line 1600 is coupled between the sensor streamer 106 and the workboat 140. Once hooked, the guide line 1600 may then be used to guide the tow fish 142 from the surface to the sensor streamer by sliding along the guide wire 1600. After the streamer cleaning device 300 has been deployed onto (or retrieved from) the sensor streamer 106, the tow fish 142 may be maneuvered back to the surface, and the guide line 1600 disconnected or released, such as by paying out additional line to unhook the hook 1602 and having the workboat 140 move in a cross-line direction prior to spooling in the guide line 1600. The use of the guide line 1600 may reduce or eliminate the need for some of the control surfaces (e.g., the tail rudders). And for the control surfaces that remain the control surfaces may implement smaller surface area as less overall control may be needed. (e.g., the hydrofoils may be reduced in size).

Figure 17:
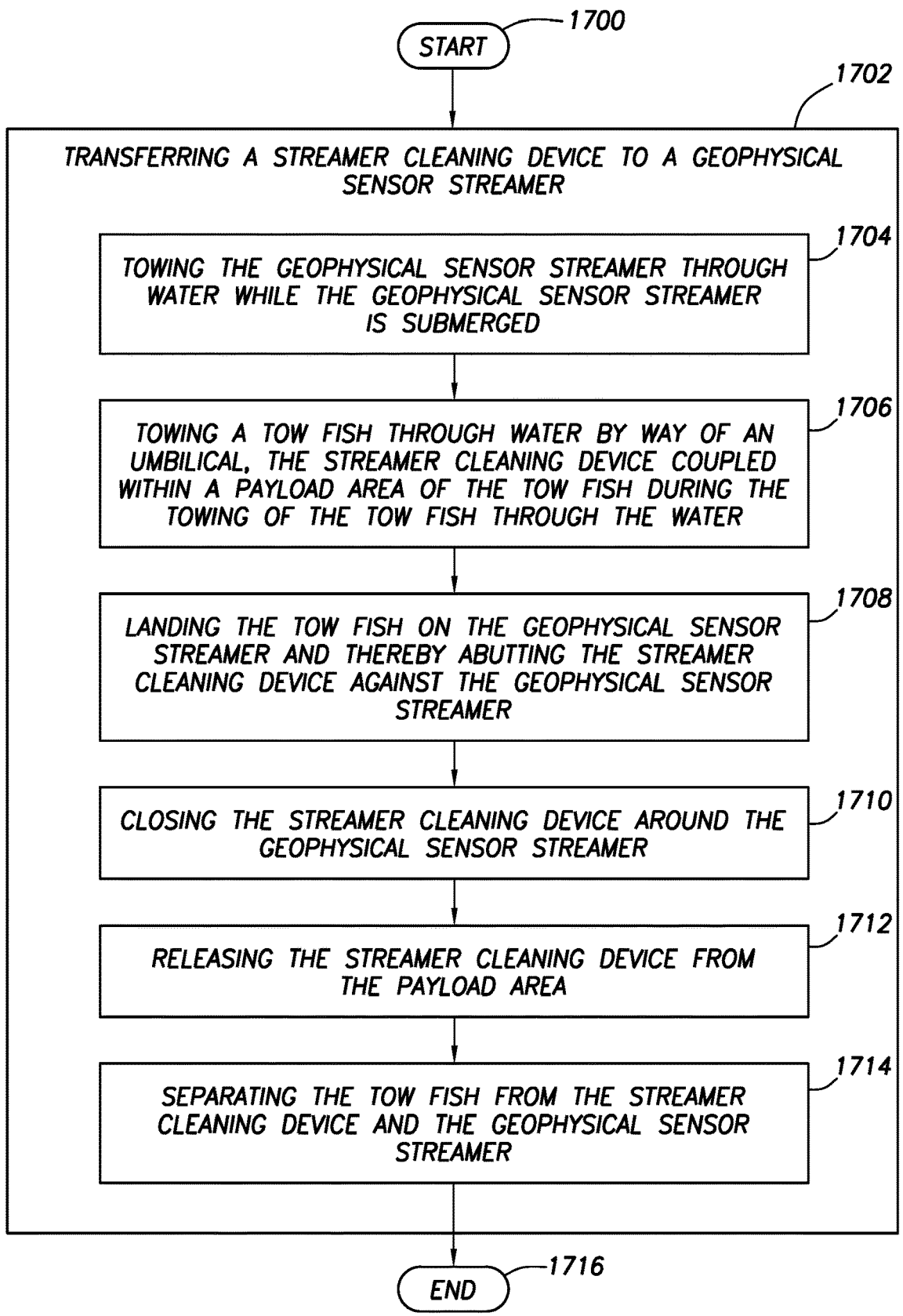
FIG. 17 illustrates a deployment method in accordance with at least some embodiments.

FIG. 17 is a method in accordance with at least some embodiments. In particular, the method starts (block 1700) and comprises transferring a streamer cleaning device to a geophysical sensor streamer (block 1702). The transferring may comprise: towing the geophysical sensor streamer through water while the geophysical sensor streamer is submerged (block 1704); towing a tow fish through water by way of an umbilical, the streamer cleaning device coupled within a payload area of the tow fish during the towing of the tow fish through the water (block 1706); landing the tow fish on the geophysical sensor streamer and thereby abutting the streamer cleaning device against the geophysical sensor streamer (block 1708); closing the streamer cleaning device around the geophysical sensor streamer (block 1710); releasing the streamer cleaning device from the payload area (block 1712); and separating the tow fish from streamer cleaning device and the geophysical sensor streamer (block 1714). Thereafter the method may end (block 1716).

Figure 18:
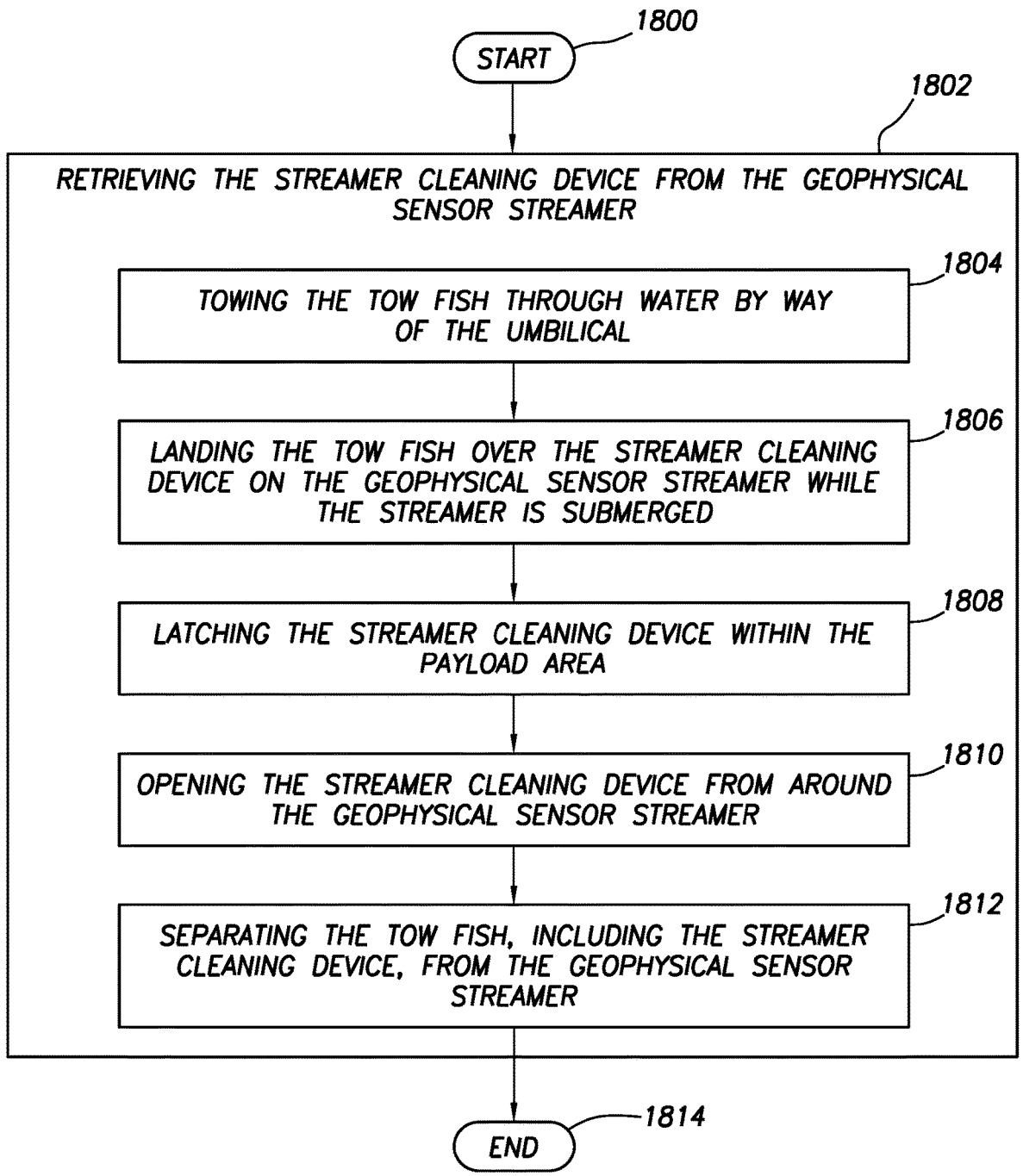
FIG. 18 illustrates a retrieval method in accordance with at least some embodiments.

FIG. 18 is a method in accordance with at least some embodiments. In particular, the method starts (block 1800) and comprises retrieving the streamer cleaning device from the geophysical sensor streamer (block 1802). The retrieving comprises: towing the tow fish through water by way of the umbilical (block 1804); landing the tow fish over the streamer cleaning device on the geophysical sensor streamer while the sensor streamer is submerged (block 1806); latching the streamer cleaning device within the payload area (block 1808); opening the streamer cleaning device from around the geophysical sensor streamer (block 1810); and separating the tow fish, including the streamer cleaning device, from the geophysical sensor streamer (block 1812). Thereafter the method may end (block 1814).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   transferring a streamer cleaning device to a geophysical sensor streamer, the transferring by:
   towing the geophysical sensor streamer through water while the geophysical sensor streamer is submerged;
   towing a tow fish through water by way of an umbilical, the streamer cleaning device coupled within a payload area of the tow fish during the towing of the tow fish through the water;
   landing the tow fish on the geophysical sensor streamer and thereby abutting the streamer cleaning device against the geophysical sensor streamer;
   closing the streamer cleaning device around the geophysical sensor streamer;
   releasing the streamer cleaning device from the payload area; and
   separating the tow fish from streamer cleaning device and the geophysical sensor streamer.

2. The method of claim 1 wherein landing the tow fish on the geophysical sensor streamer further comprises abutting a channel at a proximal end of the tow fish against an outside surface of the geophysical sensor streamer.

3. The method of claim 2 wherein landing further comprises locking the geophysical sensor streamer within the channel.

4. The method of claim 1 wherein closing the streamer cleaning device further comprises operating an actuator of the tow fish, the actuator remaining coupled to the tow fish when the tow fish separates from the streamer cleaning device.

5. The method of claim 1 wherein landing the tow fish further comprises maneuvering the tow fish, the maneuvering controlled remotely from the tow fish.

6. The method of claim 5 wherein maneuvering the tow fish further comprises at least one selected from the group comprising: controlling yaw of the tow fish; controlling pitch of the tow fish; and controlling roll of the tow fish.

7. The method of claim 1 wherein landing the tow fish further comprises:
   sending commands from a vessel at the surface of the water to the tow fish over the umbilical;
   changing position of control surfaces of the tow fish, the changing responsive to the commands; and thereby
   moving the tow fish in a cross-line direction responsive to the commands.

8. The method of claim 1 wherein landing further comprises;
   coupling a guide line between the geophysical sensor streamer and a vessel at the surface of the water; and
   guiding the tow fish from the surface of the water to the geophysical sensor streamer by the tow fish sliding along the guide line.

9. The method of claim 8 further comprising, after separating the tow fish from the streamer cleaning device and the geophysical sensor streamer, releasing a connection of the guide line from the geophysical sensor streamer.

10. The method of claim 1 further comprising:
    retrieving the streamer cleaning device from the geophysical sensor streamer, the retrieving by:
    towing the tow fish through water by way of the umbilical;
    landing the tow fish on the geophysical sensor streamer;
    latching the streamer cleaning device within the payload area;
    opening the streamer cleaning device from around the geophysical sensor streamer; and
    separating the tow fish, including the streamer cleaning device, from the geophysical sensor streamer.

11. The method of claim 10 wherein landing the tow fish over the streamer cleaning device on the geophysical sensor streamer further comprises abutting a notch at a proximal end of the tow fish against an outside surface of the geophysical sensor streamer.

12. The method of claim 11 further comprising, after abutting the notch against the outside surface of the geophysical sensor streamer, crabbing the tow fish distally along the geophysical sensor streamer until the streamer cleaning device resides within the payload area.

13. The method of claim 10 wherein opening the streamer cleaning device further comprises operating an actuator of the tow fish.

14. The method of claim 10 wherein landing the tow fish on the geophysical sensor streamer further comprises maneuvering the tow fish by at least one selected from the group comprising: controlling yaw of the tow fish; controlling pitch of the tow fish; and controlling roll of the tow fish.

15. The method of claim 10 wherein landing the tow fish on the geophysical sensor streamer further comprises:
    sending commands from a vessel at the surface of the water to the tow fish over the umbilical;
    changing position of control surfaces of the tow fish, the changing responsive to the commands; and thereby
    moving the tow fish in a cross-line direction responsive to the commands.

16. The method of claim 10 wherein landing the tow fish on the geophysical sensor streamer further comprises;
    coupling a guide line between the geophysical sensor streamer and a vessel at the surface of the water; and
    guiding the tow fish from the surface of the water to the geophysical sensor streamer by the tow fish sliding along the guide line.

17. The method of claim 16 where, after separating the tow fish and the streamer cleaning device from the geophysical sensor streamer, releasing a connection of the guide line from the geophysical sensor streamer.

18. A method of transferring a streamer cleaning device to a geophysical sensor streamer, the method comprising:
    towing the geophysical sensor streamer through water while the geophysical sensor streamer is submerged;
    towing a tow fish through water by way of an umbilical, the streamer cleaning device coupled within a payload area of the tow fish during the towing of the tow fish through the water;
    landing the tow fish on the geophysical sensor streamer by abutting a channel at a proximal end of the tow fish against an outside surface of the geophysical sensor streamer;
    locking the geophysical sensor streamer within the channel;
    closing the streamer cleaning device around the geophysical sensor streamer by operating an actuator of the tow fish, the actuator remaining coupled to the tow fish when the tow fish separates from the streamer cleaning device;
    releasing the streamer cleaning device from the payload area; and
    separating the tow fish, within the streamer cleaning device, from the geophysical sensor streamer.

19. The method of claim 18 wherein landing the tow fish further comprises:
coupling a guide line between the geophysical sensor streamer and a vessel at the surface of the water; and
guiding the tow fish from the surface of the water to the geophysical sensor streamer by the tow fish sliding along the guide line.

20. A method of retrieving a streamer cleaning device from a geophysical sensor streamer, the method comprising:
towing a tow fish through water by way of an umbilical;
landing the tow fish on the geophysical sensor streamer by abutting a notch at a proximal end of the tow fish against an outside surface of the geophysical sensor streamer; after abutting the notch against the outside surface of the geophysical sensor streamer,
crabbing the tow fish distally along the geophysical sensor streamer until the streamer cleaning device resides within a payload area of the tow fish;
latching the streamer cleaning device within the payload area;
opening the streamer cleaning device from around the geophysical sensor streamer by operating an actuator of the tow fish; and
separating the tow fish, including the streamer cleaning device, from the geophysical sensor streamer.

* * * * *